(12) United States Patent
Coombes et al.

(10) Patent No.: US 9,655,197 B1
(45) Date of Patent: May 16, 2017

(54) COLOR BASED HALF-LIFE PREDICTION SYSTEM

(71) Applicant: Gooee Limited, St Albans (GB)

(72) Inventors: Simon Coombes, St Petersburg, FL (US); Jonathan Couch, Wilshire (GB); Benjamin Hughes, Bedfordshire (GB); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/360,879

(22) Filed: Nov. 23, 2016

Related U.S. Application Data

(60) Provisional application No. 62/306,636, filed on Mar. 11, 2016.

(51) Int. Cl.
    *H05B 33/08* (2006.01)
    *H05B 37/02* (2006.01)
    (Continued)

(52) U.S. Cl.
    CPC .......... *H05B 33/0893* (2013.01); *H04W 4/06* (2013.01); *H04W 88/16* (2013.01);
    (Continued)

(58) Field of Classification Search
    CPC ..... H04W 48/10; H04W 88/18; H04W 4/005; H04W 4/06; H04W 88/06; H04W 4/023;
    (Continued)

(56) References Cited

U.S. PATENT DOCUMENTS 3,971,065 A   7/1976  Bayer
4,245,241 A   1/1981  Sato et al.
(Continued)

FOREIGN PATENT DOCUMENTS

DE    102012210743 A1   1/2014
WO    WO-2009104135 A1   8/2009
WO    WO-2015177762 A2   11/2015

OTHER PUBLICATIONS

Lighting Research Center, Assist: Alliance for Solid-State Illumination Systems and Technologies, http://www.lrc.rpi.edu/programs/solidstate/assist/index.asp.
U.S. Department of Energy, LED Measurement Series: LED Luminaire Reliability, Oct. 2009, www.ssl.energy.gov.
Philips, Understanding power LED Lifetime analysis, Technology White Paper, www.lrc.rpi.edu/programs/solidstate/assist/index.asp.
Kevin Dowling, PhD, Lumen Maintenance IESNA LM-80/2008, Oct. 30, 2008, www1.eere.energy.gov/buildings/publications/pdfs/ssl/lm80-webcast_10-30-08.pdf.
(Continued)

*Primary Examiner* — Tuyet Vo
(74) *Attorney, Agent, or Firm* — Lisa J. Moyles; Janelle A. Bailey

(57) ABSTRACT

A system and method for controlling lighting systems and predicting a life expectancy of a plurality of lighting devices are disclosed. The system may include at least one gateway that controls dimming levels of the lighting devices, and at least one of a plurality of luminaires and LEDs that communicates with the gateway via a dimming control interface. The system may further include a sensor subsystem that senses color channels and monitors at least one change in environment in real time, and at least one power meter that measures power in real time, each of which is connected to the gateway. At least one server may be connected to the gateway, and may calculate and predict lumen depreciation of the luminaires and LEDs, and reporting and changing display information associated with the luminaires and LEDs.

18 Claims, 15 Drawing Sheets

(51) Int. Cl.
*H04W 88/16* (2009.01)
*H04W 4/06* (2009.01)
*H04W 4/02* (2009.01)

(52) U.S. Cl.
CPC ..... *H05B 33/0845* (2013.01); *H05B 37/0254* (2013.01); *H04W 4/023* (2013.01)

(58) Field of Classification Search
CPC . H04W 4/14; H04W 52/0296; H04W 72/005; H04W 88/16; G09G 2320/0626
USPC .................................. 700/298, 286, 292–297
See application file for complete search history.

(56) References Cited

U.S. PATENT DOCUMENTS

| | | | |
|---|---|---|---|
| 5,770,928 | A | 6/1998 | Chansky et al. |
| 7,248,297 | B2 | 7/2007 | Catrysse et al. |
| 7,777,427 | B2 | 8/2010 | Stalker, III |
| 7,893,632 | B2 | 2/2011 | Meijer et al. |
| 7,950,832 | B2 | 5/2011 | Tanaka et al. |
| 8,643,304 | B2 | 2/2014 | Hamel et al. |
| 8,729,834 | B1 | 5/2014 | Funderburk et al. |
| 8,928,232 | B2 | 1/2015 | Aggarwal et al. |
| 9,084,308 | B2 | 7/2015 | Morrow |
| 9,131,581 | B1 | 9/2015 | Hsia et al. |
| 9,148,936 | B2 | 9/2015 | Wagner et al. |
| 2010/0262296 | A1* | 10/2010 | Davis ..................... G05B 15/02 700/275 |
| 2014/0375221 | A1 | 12/2014 | Mans et al. |
| 2016/0014867 | A1 | 1/2016 | Luk |
| 2016/0253651 | A1* | 9/2016 | Park ...................... G06F 3/0482 705/39 |
| 2016/0360594 | A1 | 12/2016 | Chemel |
| 2017/0013417 | A1* | 1/2017 | Zampini, II .......... H04W 4/043 |

OTHER PUBLICATIONS

Jeff McCullough, LC, Energy Star® Webinar: Requirements for Lumen Maintenance, Oct. 30, 2008, www1.eere.energy.gov/buildings/publications/pdfs/ssl/lm80-webcast_10-30-08.pdf.
M-Cam Patently Obvious, Kodak's Final Gasp? Intellectual Property Analysis of Kodak v Apple, HTC, Jan. 13, 2012, http://www.globalinnovationcommons.org.
Lighting Research Center, Assist: Alliance for Solid-State Illumination Systems and Technologies, Feb. 15, 2005, 2 pages, http://www.lrc.rpi.edu/programs/solidstate/assist/index.asp.
U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.
Kevin Dowling, PhD, Lumen Maintenance IESNA LM-80/2008, Oct. 30, 2008, 16 pages, www1.eere.energy.gov/buildings/publications/pdfs/ssl/lm80-webcast_10-30-08.pdf.
Jeff McCullough, LC, Pacific NW National Lab, Energy Star® Webinar:Requirements for Lumen Maintenance, Oct. 30, 2008, 18 pages, www1.eere.energy.gov/buildings/publications/pdf.
M-Cam Patently Obvious, Kodak's Final Gasp? Intellectual Property Analysis of Kodak v Apple, HTC, Jan. 13, 2012, 8 pages, http://www.globalinnovationcommons.org.
Claire Swedberg, loT Lights Up Streets with Smart City Initiative, RFID Journal, Jul. 23, 2015, 3 pages, http://www.iotjournal.com/articles/view?13303.
Dali, Discover Dali—Excellent System Performance, Mar. 31, 2014, 5 pages, http://dali-ag.org/discover-dali.html.

* cited by examiner

COLOR BASED HALF-LIFE PREDICTION SYSTEM

CROSS-REFERENCE TO RELATED APPLICATIONS

This application claims priority to U.S. Provisional Patent Application No. 62/306,636 filed Mar. 11, 2016, and incorporated herein by reference in its entirety.

FIELD

A system for identifying lumen intensity depreciation over time is generally described. In particular, a system and method for predicting life expectancy of a plurality of luminaires are disclosed.

BACKGROUND

The lifetime of traditional light sources, such as, for example incandescent, fluorescent, and high-intensity discharge lamps, are estimated through industry-standard lamp rating procedures. Typically, a large, statistically significant sample of lamps is operated until about 50% have failed, which at that point, in terms of operating hours, defines a "rated life" for that lamp. Decrease in lumen output may occur as a lamp or light fixture operates over a long enough period of time. Based on years of experience with traditional light sources, lighting experts often use lamp life ratings, along with known lumen depreciation curves, to design the lighting for a desired space, and to determine re-lamping schedules and economic payback. This aspect of predictive life or half-life of a light source is not particularly true with light emitting diodes (LEDs), which can continue to operate at very low light levels and are at less risk of critical failure compared to traditional light sources. An LED's end-of-life may be measured in terms of lumen flux depreciation to a particular level as defined by manufacturers or by standard test methods.

According to the Alliance for Solid-State Illumination Systems and Technologies (ASSIST), the threshold at which human eyes may detect light output reduction is about 70% lumen maintenance. Further research conducted by ASSIST shows that a 30% reduction in light output may be acceptable to a majority of those who use luminaires (otherwise known as lighting devices or lighting fixtures and is defined as a complete electric light unit, which includes any sort of light source—incandescent, fluorescent, high-intensity discharge lamps, LEDs, and the like) in general lighting applications, however, ASSIST recommends considering both higher and lower figures for lumen maintenance for certain types of applications. These applications may include, for example, a wall-washing application where lights may be seen by users side-by-side, which may require that the useful life of the lumen to be calculated on a higher figure, such as, typically 80% for lumen maintenance. In some applications where light outputs are not critical, such as, for example, decorative light systems, lower lumen maintenance thresholds may be acceptable. ASSIST has proposed that two coordinates be used to express the useful lifetime of an LED component, $L_{70}$ and $L_{50}$. Rated lumen-maintenance life is measured in hours with associated percentage of light output, noted as $L_p$. In other words, $L_{70}$ of 30,000 hours means that the tested LEDs produce 70% of the initial light output at 30,000 hours. If an LED has $L_{50}$ of 30,000 hours, its lumen output decays faster than one with $L_{70}$ of 30,000 hours. Since the temperature of the device may impact these figures, thermal design of devices is critical, but may not be enough. Dimming level and average power of the lighting device, e.g., level of usage, may dictate its $L_{70}$ and $L_{50}$. Changes in current may also impact the $L_{50}$ of the LED device. The same may be true for constant current, where temperature variations will impact the $L_{50}$ number.

With reference to FIGS. 15 and 16 Philips published a Technology White Paper, entitled *Understanding Power LED Lifetime Analysis*, date unknown, in which typical graphs of factors impacting LED lifetime were provided. According to FIG. 15, if temperature is constant, changes in current will impact the L50 of the LED device. The same is true for constant current, (see FIG. 16, in this case 1.5 A), where temperature variations will impact the L50 number. Both graphs were taken from the above Philips White paper.

LEDs usually do not fail abruptly like traditional light sources; instead, their light output slowly diminishes over time. Furthermore, LED light sources can have such long lives that life testing and acquiring real application data on long-term reliability becomes problematic—new versions of products are available before current ones can be fully tested. To add more to the challenge, LED light output and useful life are highly dependent on electrical and thermal conditions that are determined by the luminaire and system design. This conclusion is reflected in the Philips Technology White Paper, titled "Understanding power LED lifetime analysis," which may be found at www.lrc.edu/programs/solidstate/assist/index.asp.

A disadvantage with current LED systems and methods is that there is currently no standard format for reporting LED lifetimes and/or lumen depreciation curves. According to a Paper published by the U.S. Department of Energy, titled "LED Luminaire Reliability," and retrievable from http://ephesuslighting.com/wp-content/uploads/2014/01/Fact-Sheet-LED-Luminaire-Reliability.pdf, "A test procedure currently in development by the Illuminating Engineering Society of North America (designated LM-80, IESNA Approved Method for Measuring Lumen Maintenance of LED Light Sources) will provide a common procedure for making lumen maintenance measurements at the LED device, array, or module levels". Further, the U.S. Department of Energy paper states: "The LM-80 test procedure addresses only one factor in the life of an LED luminaire—lumen depreciation of the LED device over the prescribed test period." For LED light sources, LM-80 defines lumen-maintenance life as "the elapsed operating time at which the specified percentage of the lumen depreciation or lumen maintenance is reached, expressed in hours." Different from rated life, the rated lumen-maintenance life is defined as "the elapsed operating time over which an LED light source will maintain the percentage (p) of its initial light output." A disadvantage with this method is that there are usually many additional factors to consider when LEDs are installed in a luminaire or systems that can impact the rate of lumen depreciation or the likelihood of catastrophic failure, and this test method fails to address those additional factors. These additional factors may include temperature extremes, humidity, moisture incursion, voltage or current fluctuations, failure of the driver or other electrical components, damage or degradation of the encapsulation material covering the LEDs, damage to the wire bonds that connect the LEDs to the fixture, and degradation of phosphors.

Current lumen depreciation models may be applied solely to the light source, (i.e., LED Chip) and not the luminaire. The light source is driven at a specified current at three temperatures: 55 degrees Celsius, 85 degrees Celsius and a third manufacturer specified temperature. The light source may be driven at 100% output for a minimum of 6,000 hours. From the data collected, predictions can be made regarding the end of life of the light source. The lifetime predictions of the light source may be inherited by the luminaire that has the tested light source installed. That prediction may fail to take into account additional factors that may affect the projection. These factors may include manufacturing defects, such as, heat sinking/thermal management, ambient temperature of installation, and even control strategy of luminaire in operation—all of which can have a positive and negative impact on the lumen depreciation. LM-82-12, the approved method for the "Characterization of LED Light Engines and LED Lamps for Electrical and Photometric Properties as a Function of Temperature," addresses/covers the testing of light engines/luminaires and integrated lamps. While the LM-82-12 may cover these additional factors, it may be cost prohibitive for luminaire manufacturers, thus, LM-80 predictions verified to run at a certain temperature within a luminaire may be the norm. A further disadvantage with LM-82 testing, is that even if LM-82 testing has been carried out, it is done at set conditions and cannot compensate for different dimming levels, i.e., wattages and temperatures over time.

Given the state of the art, it is clear that there is a need for a solution that allows users/customers to be able to predict when sufficient lumen degradation has occurred such that action needs to be taken to replace the light source, unless worse case assumptions on running conditions and time are accepted as truth. Customers who may need to install large quantities of luminaires, such as, for example, tens of thousands of luminaire systems, need to have a way to predict when and how much each luminaire has degraded over time. The absence of clear and specific guidance leads to luminaires that may be replaced ahead of time, being replaced too late, and/or having increased/higher costs of maintenance.

Further, there is a need for a system and a method that identifies in real time the current state of a luminaire and notifies a maintenance team when to replace a luminaire, while providing data to the manufacturers of the luminaire about the current state, environmental readings and statistical behavior of their devices installed in customer sites. As used herein, reference to "current" or "real time" means without intentional delay, given the processing limitations of the system and the time required to accurately measure the data. Manufacturers of the luminaires could benefit greatly by receiving real time data related to actual in situ usage of their devices. Control strategy may play an integral role in the lifetime of an LED product, and when a lighting product is installed, a maintenance factor may have been applied to the lighting design to compensate for lumen depreciation. If no control strategy or commissioning has been implemented, this may result in the luminaire running at ~15% higher output than is necessary, decreasing its useful life. There is therefore a need for a system and method that provides a control strategy that helps facilitate maintenance of a luminaire based on its current state.

Further, there is a need for a method of projecting lumen depreciation over time in a manner that takes into consideration all of the above-mentioned factors. A solution is needed in which technology local to the luminaire is enabled, as well as by the utilization of an Internet Of Things (IoT) network, to provide an accurate solution that is cost effective to both the customers who use the luminaires, as well as the manufacturers of the luminaires.

BRIEF DESCRIPTION

This disclosure relates to a system and a method of predicting life expectancy of a plurality of lighting devices. According to an aspect, the system includes at least one gateway that is capable of controlling a plurality of dimming levels of the lighting devices. The system may further include at least one of a plurality of luminaires and a plurality of LEDs. The luminaires and/or the LEDs may communicate with the at least one gateway via at least one dimming control interface. According to an aspect, the system includes at least one sensor subsystem that senses a plurality of color channels and monitors at least one change in environment in real time. The at least one sensor subsystem may be connected with the at least one of the gateway along with the at least one of the luminaires and/or the LEDs. The system may further include at least one power meter for measuring power in real time. In an embodiment, the at least one power meter is connected with the at least one of the gateway along with the at least one of the plurality of luminaires and the plurality of LEDs. According to an aspect, the system includes at least one server that calculates and predicts depreciation of the dimming levels and/or end of life and/or half-life of the luminaires and/or the LEDs, and reports and changes status information associated with the luminaires and/or the LEDs. In an embodiment, the server is connected via at least one of a wired connection and a wireless connection, with the at least one gateway.

In one aspect, the present application is directed to a method of predicting a life expectancy of a plurality of lighting devices. In an embodiment, the method includes receiving, by at least one gateway, at least one real time sensing measurement data from at least one sensor subsystem via at least one sensor interface. The at least one sensor subsystem may be physically connected to the at least one gateway. The method may further include receiving, by the gateway, at least one real time power measurement data from at least one power meter via at least one power interface. According to an aspect, the power meter is physically connected to the at least one gateway. The method may include forwarding, by the at least one gateway, the real time sensing measurement data and the real time power measurement data to at least one server. In an embodiment, the method includes calculating, by the at least one server, a depreciation of dimming levels of the plurality of lighting devices by performing a correlation operation between or amongst at least one of the received at least one real time sensing measurement data and the received at least one real time power measurement data, and at least one of at least one luminaire and at least one LED. In an embodiment, the luminaire and/or the LED may be controlled by the gateway. In an embodiment, the method includes generating, by the at least one server, at least one life prediction graph based on the correlation present between at least one theoretical lumen prediction graph generated by a manufacturer of at least one of the luminaire and the LED in an ideal condition, and a plurality of present measurements forwarded by the at least one gateway. According to an aspect, the method includes accurately predicting, by the server, at least one of at least a 70% lumen measurement ($L_{70}$) and at least a 50% lumen measurement ($L_{50}$) of at least one of the luminaire and the LED in their current environment, and recommending further, by the server, at least one alternative schedule to extend the 50% lumen measurement ($L_{50}$) of the luminaire and/or the LED, while maintaining expected luminosity at one appropriate level.

Embodiments in accordance with the present disclosure enables a lighting manufacture/users/customers to be able to predict when lumen degradation is such that action needs to be taken once the luminaire has been installed. These and other advantages will be apparent from the present application of the embodiments described herein.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein.

Figure 1:
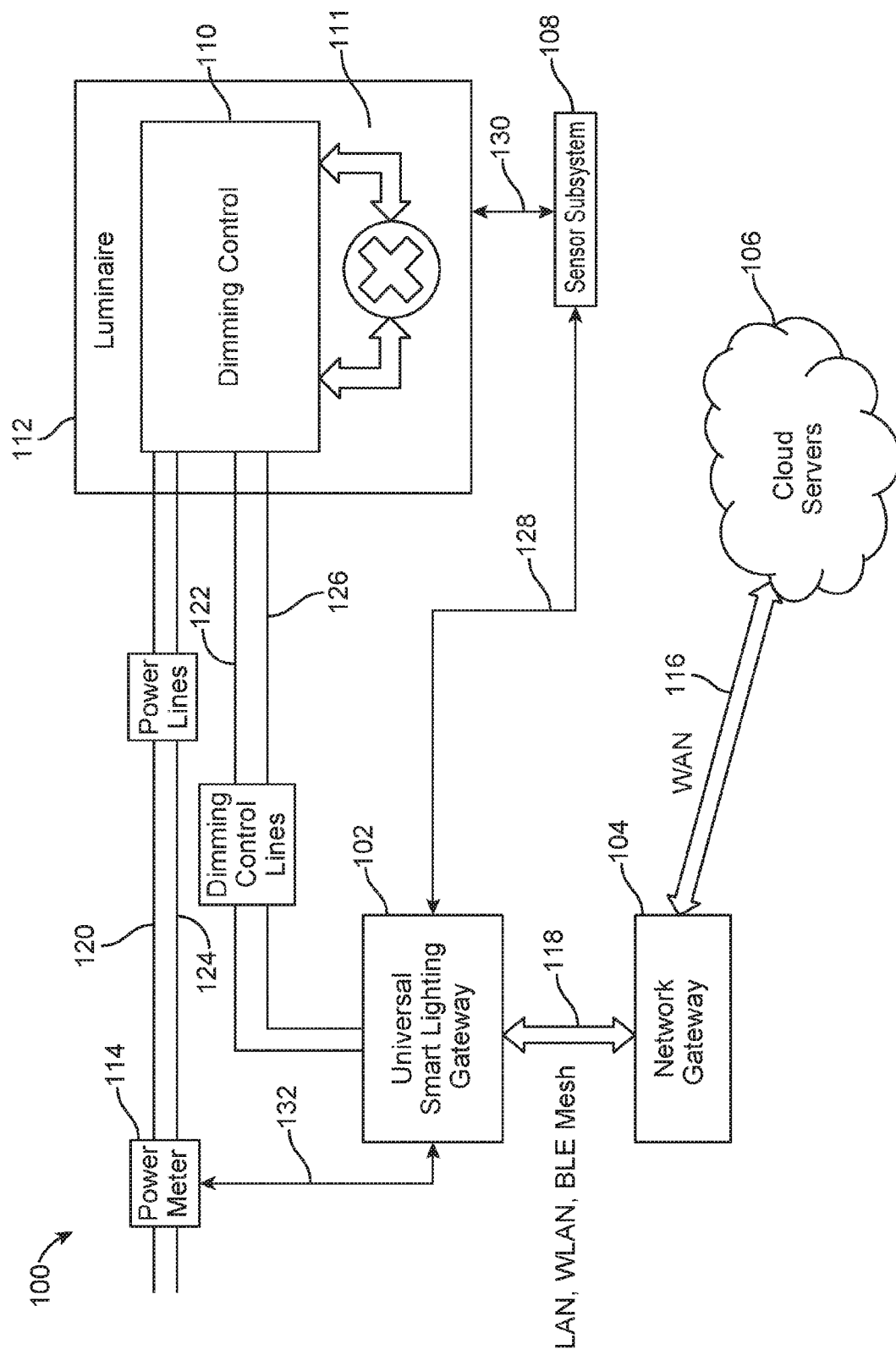
FIG. 1 illustrates a high-level system diagram of a gateway, according to an aspect.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

Embodiments of the present disclosure relate generally to a system and method for identifying lumen depreciation over time. The system and method may predict life expectancy of a plurality of lighting devices. Additionally, they predict lumen degradation, which facilitates maintenance of lighting devices by the manufacturer/user/customer. Embodiments of the present disclosure will be illustrated below in conjunction with the figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAIVI, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and prior art-recognized equivalents and successor media, in which the software implementations of the present disclosure are stored.

According to an aspect and with reference to FIG. 1, a system 100 for predicting life expectancy of a plurality of luminaires 112 is described. The plurality of luminaires 112 may include at least one light source, which may include a plurality of Light Emitting Diode (LED) devices 111, and a dimming controller device or driver or interface 110. The luminaire 112 is connected to one or more sensors found in at least one sensor subsystem 108. The sensors may be connected to at least one gateway 102, which is a device configured to control and communicate with the luminaire 112. The system 100 includes the at least one gateway 102, which in an embodiment is a protocol agnostic gateway and/or a Universal Smart Lighting Gateway (USLG), at least one power meter 114, and at least one server 106. The system 100 may also be referred to as a scenario/an environment.

The gateway 102 may be capable of detecting, communicating and handling/controlling a plurality of dimming protocols via the dimming control device 110, and to control the dimming controller 110 to provide a plurality of dimming levels to the luminaires 112. The gateway 102 is configured to receive information related the current dimming level of the luminaires 112. The dimming protocols include, but are not limited to, 0V-10V, 1V-10V, DALI and DMX. According to an aspect, both digital and analog protocols and interfaces are included. Embodiments in accordance with the present disclosure do not limit the type of hardware/wire/bus interfaces between the gateway 102 and the dimming device 110, e.g., the number of wires, the type of wires or bus connectors. The dimming control lines 122, 126 connections may be analog interface control wires and/or electrical/digital bus connectors, of any kind. The dimming interface is tagged as ("dimming interface").

In an embodiment, the luminaire 112 is a system that may include a single luminaire or multiple luminaires connected with a single common interface to power lines 120, 124 and dimming control lines 122, 126. According to an aspect, a power meter 114 may be connected electrically between the gateway 102 and the luminaire 112 and may be connected electrically to the luminaire 112 via the power lines 120, 124. The power meter 114 may be connected to the gateway 102 via the power meter interface 132. The power meter 114 connections are described in further detail hereinbelow, with reference to FIG. 2.

The power meter 114 may be connected to an input line of the luminaire 112 (see FIG. 1), in such a way that the power meter 114 measures electrical power drawn by the luminaire 112 at any given moment in real-time. According to an aspect, the power meter 114 is connected to the gateway 102 to provide real-time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used. Since this is prior art and a well-known technology, a person of ordinary skill in the art will appreciate the know-how associated with power meter connections.

As illustrated in FIG. 1 and according to an aspect, the system 100 includes the at least one sensor subsystem 108 detects information related to the system 100 and the luminaires 12 by detecting current conditions of at least one of the luminaires 112. The sensor subsystem 108 includes at least a first sensor to detect the color intensity and a second sensor to detect at least one change in the environmental condition. Thus, the current conditions of the luminaires 112 can be detected, whether that be the current color level or intensity, the current temperature or voltage or humidity of the like, the current dimming level, and the like. The information is relayed to the gateway 102, which relays the information to the server 106 for storage, processing and the like. Thus, the sensor subsystem 108 senses/detects a plurality of color channels and monitors at least one change in environment in real time. The information collected by the gateway 102 includes a current power level of the luminaires 112 as measured by the power meter 114, which measures the current power level being used by the luminaires 112. The gateway 102 is configured to receive information related to the plurality of luminaires 112, and the information includes the color intensity and at least one environmental condition sensed by the sensor subsystem 108 as will be discussed in greater detail hereinbelow. The sensor subsystem 108 may be arranged such that it connects via connection 130 to the luminaire 112 on one side and to the gateway 102 via a sensor interface 128 on the other side. According to an aspect, the connection 130 to the luminaire 112 is physical and is not limited to a specific location. The location of the sensor subsystem 108 may be different for various types of sensors that are to be positioned.

The gateway 102 is capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors. The connections can be as simple as analog interface connectors and/or electrical/digital bus connectors of any kind. The sensor interface 128 is tagged as "sensor interface".

The sensor or combination of sensors may measure multiple color channels ("color sensor") directly facing the luminaires as well as a low resolution imaging sensor which could be an array of sensors combined into a low resolution imaging device, or a single ASIC that is an imaging sensor ("environment sensor"). The color sensor may be used to measure both the color content of a light source and the color intensity. The color sensor can be based on a single color or a plurality of colors.

According to an aspect, the environment sensor is used for monitoring the information to be collected about the environment of the light source. The environment sensor may include three or more different sensors, such as, a low-resolution image sensor, an ambient light sensor, and a temperature sensor. Embodiments in accordance with the present disclosure can use other sensors and more types of sensors to characterize the environment. Without limitation, this disclosure is referring to the three sensors included in the environment sensor as "environment sensor". Further, without limitation, the environment sensor may include less or more sensors than are described herein. To be sure, the environment sensor provided as a part of the combination of sensors, may include sufficient/enough information to measure the environment, as described in this disclosure. As will be described in further detail hereinbelow, the system and method of this disclosure is associated with half-life prediction of the luminaire being measured and maintained.

According to an aspect, the combination of the environment sensor and the color sensor, is set into one of a single ASIC or a set of separate devices, all of which are also connected to the gateway 102. The sensors may be directed as follows: the color sensor faces the luminaires, and the environment sensor faces away from the luminaires in such a way that it monitors the environment. Real time measurements and assessments may be conveyed to the gateway 102 by the sensors that make up the sensor subsystem 108.

Embodiments in accordance with the present disclosure provide the system 100 in which the gateway 102 can control the dimming device 110 and change the dimming level and the color temperature of the luminaire 112, albeit only in luminaire devices that allow for color temperature controls. In an embodiment, the gateway 102 receives a set of directives or instructions for dimming setup and sensor measurements to occur at a specific day and time and/or on a specific schedule that repeats itself. Such information may be stored in a scheduling database. (See, for instance, FIG. 5 regarding the Dimming and Testing Schedule Database 524.) The scheduling database is a database for storing a time schedule for conducting the detecting of information. The server 106 accesses the scheduling database and transmits a scheduling message to record the current dimming level and to detect the current conditions of the luminaires 112 by the sensor subsystem 108. According to an aspect, the sensors of the sensor subsystem 108 can be programmed via the gateway 102 such that they will provide event A data only in cases where color intensity is outside a predefined range. The gateway 102 may be controlled such that it executes measurements only when environment measurements are in a certain range, as well as when the dimming level is in a certain range. According to an aspect, the dimming parameters, the environmental reading parameters and the sensor parameters and reading setup, are all controlled from outside of the gateway 102 via cloud sensors 106 connecting to the gateway 102. A person of ordinary skill in the art will appreciate that the control described here allows the system to set up a miniature-controlled environment in which the color intensity of the luminaire 112 can be measured.

According to an aspect, the environment and color sensors of the sensor subsystem 108 are placed/connected on a fitting of the luminaire 112. The exact location of the sensors is not fixed, e.g., two different luminaires by the same manufacturer of the same type of fitting and LED specifications may be assembled such that the sensor location is different relative to the surface and dimensions of the fitting. Thus, the location of the color and environment sensors on the fitting is not limited. The requirement of placing the color and environment sensors on the fitting at specific locations is mitigated by this disclosure.

Embodiments in accordance with the present disclosure provide a system that includes a color sensor that provides continuous measurements of a plurality of color channels. In an embodiment, these color channels can be Blue, Yellow and Green channels. In other embodiments the color channels are Red, Green and Blue channels. These measurements may be specific to the color sensor and its design, such that different color sensors may provide different color intensity readings, yet the sensor readings will depreciate at the same rate relative to the said color sensor. According to an aspect, the process of calibration of the sensor is such that the depreciation of a sensor follows a known graph which was studied for the specific color sensor CMOS. In an embodiment, the sensor readings are normalized by its previous readings, such that only the normalized change in reading is significant. Color sensors do not differ from one another in any significant way after normalization of the readings, e.g., if we take two different color sensors CMOS that are attached to the same luminaire in different physical attachment locations on the fitting, we may expect to receive different absolute Red, Green, Blue and Yellow intensity readings when compared between the two sensors, yet the normalized values read by the individual sensor of the % change in color intensity will have a very close, negligible difference. For instance, we may read Red intensity as x1 and y1 at time t1 from the two sensors. At t2, we read x2 and y2 respectively. Then $x2/x1=y2/y1+w$ where $w \ll 1$ (for example, where w is very small). Embodiments in accordance with the present disclosure allow for an exponential relationship between color intensity measurements and lumen intensity of the LED. This relationship is known/calculated by the cloud server.

The system 100 may continuously receive real-time performance measurements from the sensor devices of the sensor subsystem 108 via the sensor interface 128 and power measurements from the power meter 114 via the power meter interface 132. According to an aspect, the gateway 102 sends these readings in a compressed format to the cloud servers 106. According to an aspect, the gateway 102 is configured to relay the information collected by the system to the at least one server 106 for processing, storage, calculating, compilation, comparing, and the like. According to an aspect, the server 106 includes a processor configured to receive and use the information to calculate and predict the life expectancy of the luminaires and to generate and relay a life expectancy report to a user. The compressed format may includes two types of messages, namely a baseline message set and an updates message set as will be discussed in greater detail hereinbelow with reference to FIG. 4. In general and to be sure, a message set may be any one of the baseline message and/or set of messages and the updates message set. According to an aspect, the baseline message set includes the full sensor readings, power level readings and current dimming state. According to an aspect, the updates message set includes changes or differentiations from the previous message set. The baseline message may be sent upon major change, such as a change in the dimming level, while the updates message set may be sent at regular intervals. According to an aspect, the updates message set includes readings that are significantly different from the previous set. In one embodiment, sensor readings can be averaged over the time interval between two consequent updates message sets.

The system 100 may include a backhaul interface 118 for connecting the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is a Mesh BLE. The communication protocol may include the Mesh BLE. The gateway 102 is thus connected to the back-end network 104 via LAN, WLAN, WAN, Mesh BLE radio network or other means. This connection may allow another device on the network local to the gateway or via WAN in the cloud, to handle the lumen prediction process. Thus, the entire luminaire half-life prediction process can be distributed between physical machines or on a single machine, local or remote to the gateway 102 itself.

Embodiments in accordance with the present disclosure provide the system 100 that includes the gateway 102, which can interface with other control systems or devices via wired connections, Ethernet connections, wireless connections or any combination thereof, and can receive control messages that direct the gateway 102 to change the dimming level via its dimming interface/control/driver 110. This interface or plurality of interfaces may be the backhaul interface of the gateway ("backhaul interface"). The protocol used in this interface and the interface itself is the ("backhaul protocol"). Embodiments in accordance with the present disclosure provide a system in which the backhaul protocol is capable of delivering dimming directions to the gateway 102 as well as receiving sensor and power level readings via the sensor subsystem 108 from the gateway 102 associated with the monitored/managed luminaires 112 by this gateway 102.

According to an aspect, the gateway 102 is connected to the network gateway 104, which resides between the local networks to a wide area network (WAN) 116. In an embodiment, the WAN 116 connects the gateway 102 to cloud computers/servers 106 for operational and management interfaces.

According to an aspect, the gateway 102 is configured to control a plurality of dimming levels of the lighting devices and is capable of communicating sensor readings and the dimming level as well as a power reading of the luminaire 112 over the wired/wireless network(s) 118 and via the Wide Area Network ("WAN") 116 to the server 106 for processing.

As described in greater detail in commonly owned U.S. patent application Ser. No. 15/344,263, filed Nov. 4, 2016, ("the '263 Application"), which is incorporated herein by reference in its entirety, the system 100 may facilitate dynamic discovery of a dimming protocol that runs over the dimming control lines 122, 126. The server 106 may calculate and predict depreciation of the dimming levels of the plurality of luminaires 112. According to an aspect, the server 106 is configured to report the current prediction via a plurality of user reporting mechanisms, including a real time display of status and prediction information associated with the plurality of luminaires 112.

Embodiments in accordance with the present disclosure provide that the cloud servers 106 are continuously receiving performance measurements from the plurality of gateways 102. In one embodiment the cloud servers 106 provide each gateway 102 with a table of reading directions that includes the correct sensor reading thresholds for specific dimming levels associated with the specific luminaire 112. The gateway 102 may report changes or deviations from this internal table to the cloud servers 106. Using this method, the system 100 may further reduce the amount of information that needs to be transmitted over the gateway 102 backhaul 118. In this way the cloud server applications can control the rate of information sent by the gateway 102 and more accurately predict the LED 111 behavior.

The system 100 sends sensor readings and other information over the backhaul 118 to the cloud server 106 at random times. According to an aspect, this allows for better utilization of the backhaul 118, which may be a wireless mesh network with limited backhaul capacity. In an embodiment, a message being sent at random time periods during the day will include a correct time stamp of the reading, and the dimming level. The message receiving time at the cloud server is not the measurements' time, thus tagging the measurement correctly with time of measurement may be required.

The system 100 includes the cloud servers 106, which continuously receive performance measurements from the plurality of gateways 102. These cloud servers 106 perform correlations between received information and the specific LEDs 111/luminaires 112, which are controlled by these gateways 102, and derive an expected lumen prediction graph. The prediction may be based on the lumen prediction graph, that is, the theoretical lumen degradation prediction graph in ideal known conditions developed by the LED manufacturer, (and stored in a Driver Manufacturers database (DB) 820, as discussed in greater detail hereinbelow with reference to FIG. 8), and the measurements acquired through the sensor subsystem 108, the power meter 114 and/or the dimming level set by the dimming control device 110. Thus, the real-time measurements are compared/correlated to the predicted or manufacturer's life (end of life and/or half-life) graph to establish an actual graph of what the specific luminaires 112 are experiencing in actuality. Thus, a solution that allows users/customers to more accurately predict when sufficient lumen degradation has occurred such that action needs to be taken to replace the light source is provided. Using this correlated information, the system can more accurately predict $L_{70}$ and $L_{50}$ for the specific luminaire in its current environment. According to an aspect, the dimming and/or testing schedule is updated based on differences detected between current information received/collected and previous information that had been received/collected previously.

Figure 2:
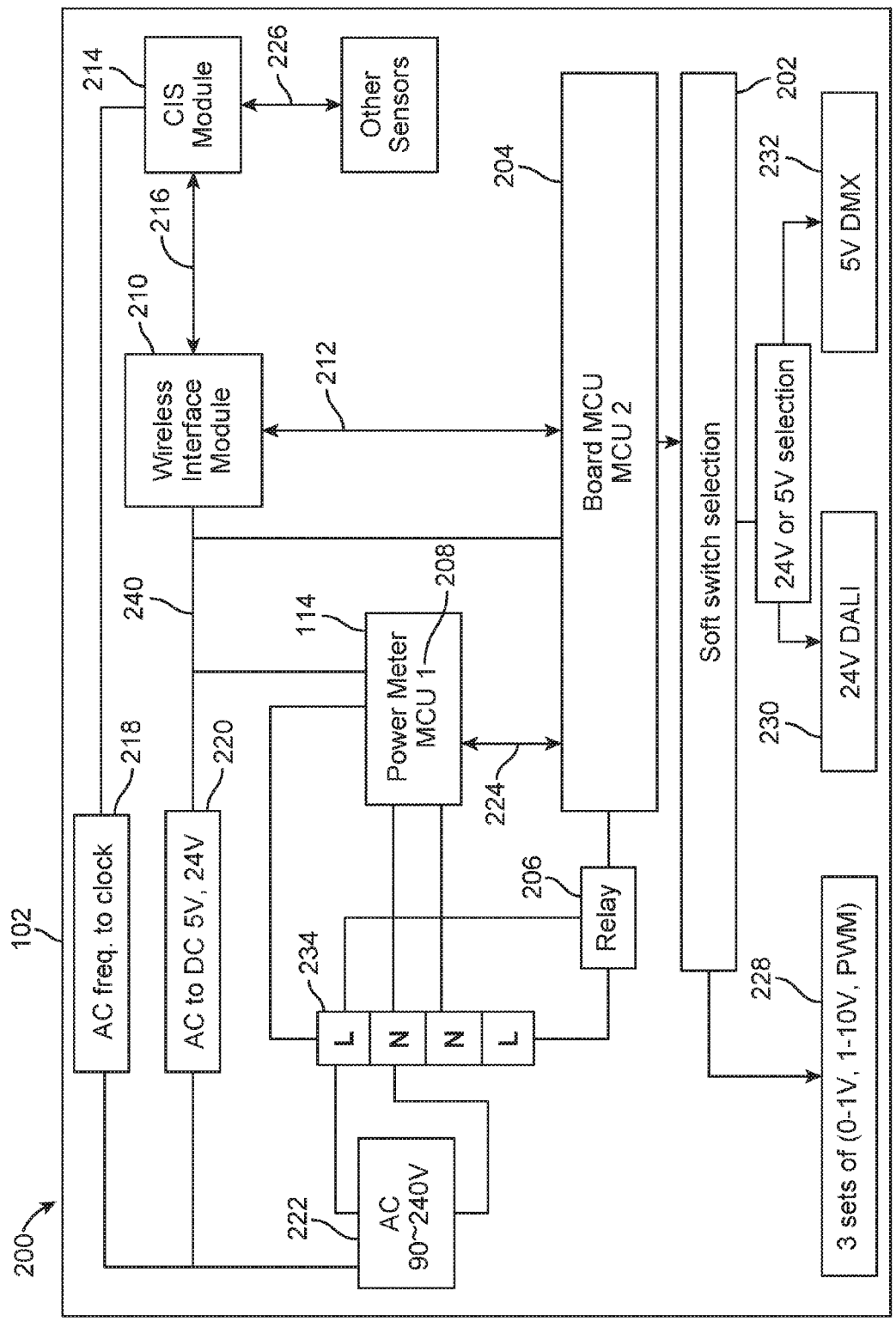
FIG. 2 illustrates a gateway box diagram, according to an aspect.

FIG. 2 depicts the gateway 102 in further detail. According to an aspect, a soft switch 202 to select between different electrical dimming interfaces is provided. The soft switch 202 may be actively used to search for the correct protocol between the gateway 102 and the luminaire 112 (not shown in this figure). The luminaire 112 may be a dimming luminaire 112. According to an aspect, protocol modules 228, 230, and 232 are the software implementation of the dimming interfaces that reside in the gateway 102. In an embodiment, the supported dimming protocol includes several sets of protocols, such as, for example, 0V-10V, 1V-10V, PWM 228 protocols over 0V-10V and/or 1V to 10V, a 24V DALI 230 protocol, and a 5V DMX 232 protocol. DALI is a digital control protocol that allows individual addressable luminaires. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to be able to cut off/block a current to the luminaire 112 upon a decision by the MCU-2 204. The power cutoff can be used to disconnect power from the controlled luminaire subsystem (see, for example, FIG. 1). In an embodiment, the WIM 210 is implemented as a Bluetooth Low Power (BLE) device that uses Mesh BLE protocol to connect with other devices, as well having the SPI bus 212 and an Inter-Integrated Circuit Two-Wire Serial Interface bus (TWSI) 216. The WIM 210 is connected to the Camera Interface System (CIS) module 214, which may be, for instance, an environmental sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 is illustrated in FIG. 2, and according to an aspect, provides the physical electrical line connections.

Figure 3:
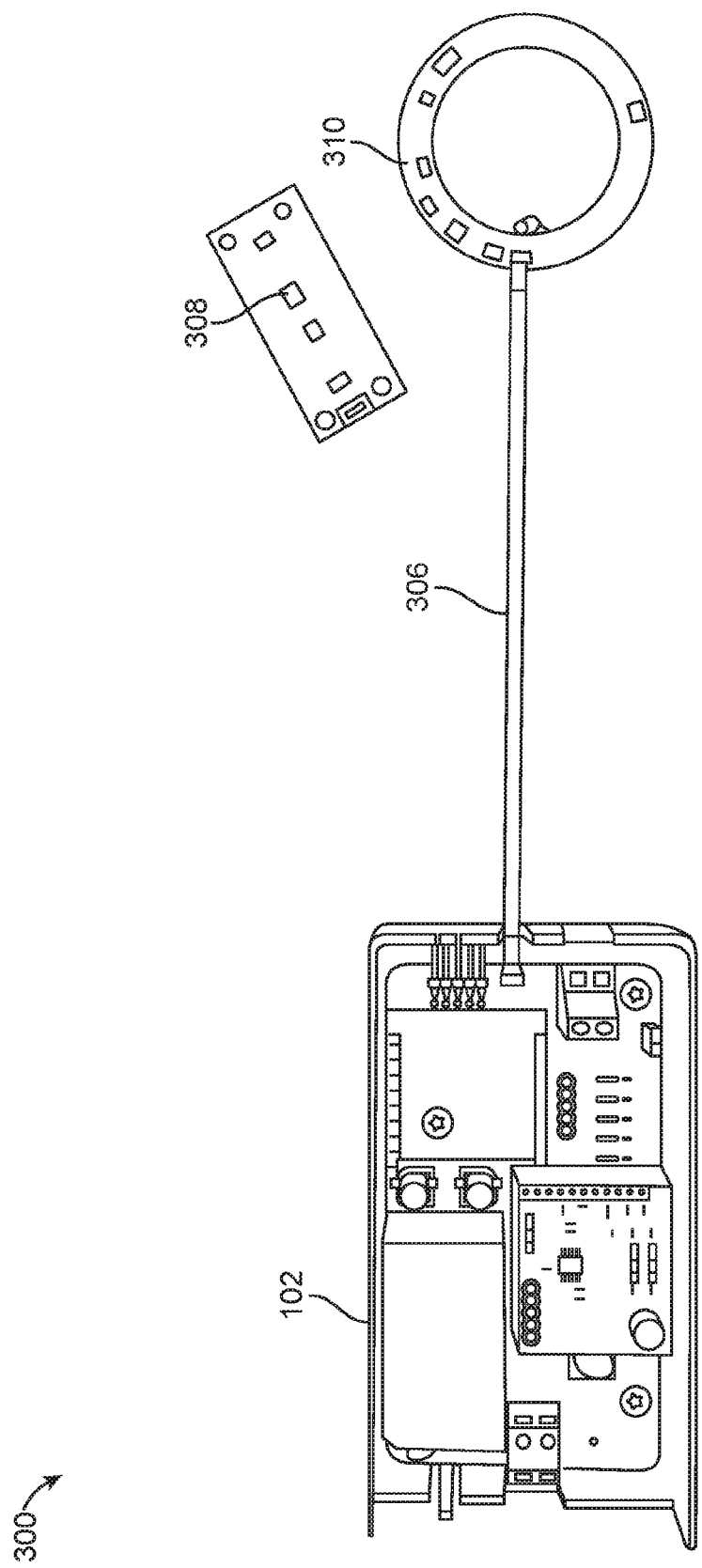
FIG. 3 illustrates a diagram of a sensor connection to a luminaire, according to an aspect.

According to an embodiment, and as illustrated in FIG. 3, the system 300 may include one or more sensors 308, 310, typically configured as CIS modules, connected to the gateway 102 via the TWSI connection using a 6 pin or 8 pin FPC cable and a connector 306. FIG. 3 illustrates an embodiment that includes at least one of a first CIS module 308 and a second CIS module 310. (Only one connection is actually depicted, but it would be understood by one of ordinary skill in the art that one or both of the sensors 308, 310 can be connected to the gateway 102.) The CIS modules 308, 310 may be physically connected at any desired position on the luminaire 112 (not shown). According to an aspect, the CIS module 308 is a linear module that can be adopted to fit on luminaires 112/devices that require a linear fitting. In an embodiment, the CIS module 310 is circular, and may be designed to fit circular-shaped luminaires 112.

In an embodiment, each of the CIS 308 and CIS 310 sensors include at least two sets of sensors (not shown). A first set of sensors (e.g., "environment sensors"), may be dedicated to environment sensing, and may be arranged such that the sensor faces away from and/or extends in a downwardly fashion from the luminaire 112. According to an aspect, a second set of sensors or a single sensor (e.g., a "color sensor"/"RGB sensor") is arranged such that it faces the luminaire 112 directly. The first set is named the environment sensor and the second set is named the RGB sensor. The combination of the two sets of sensors, namely the environment sensor and the RGB sensor, may be combined into a single ASIC or may be arranged as a set of separate devices. According to an aspect, the first and second set of sensors of the CIS 308 and CIS 310 modules may also connect with the gateway 102. Both sets of sensors may provide real time measurements and assessments to the gateway 102. In response to the measurements and assessments provided, the gateway 102 may control the dimming device and change the dimming level and a color temperature and RGB/RGBW (Red Green Blue Warm White) color, in devices that allow for color temperature and RGB/RGBW color control.

According to an aspect, the system 100 includes the RGB sensor directly facing the luminaires 112 (not shown). The RGB sensor may measure both the RGB content of a light source and the color/RGB intensity of the light source. According to an aspect, the RGB sensor or combination of sensors are configured to measure multiple color channels as they directly face the luminaires 112.

The environment sensor may be a low resolution imaging sensor, such as an array of sensors combined into a low resolution imaging device, or a single ASIC that is an imaging sensor. According to an aspect, the environment sensor measures environmental parameters and is/are facing away from the luminaires 112. The environment sensor be arranged to monitor the environment of the light source. According to an aspect, the environment sensor includes at least three different types of sensors, such as, a low-resolution image sensor, an ambient light sensor, and a temperature sensor. Without limitation, this disclosure refers to the three sensors included in the environment sensor as "environment sensor". In an embodiment, the environment sensor includes several environmental sensors. In other words, the environment sensor may include less or more sensors than described herein. Embodiments in accordance with the present disclosure can use other sensors and more types of sensors to sense the environment. In an embodiment, the environment sensor is a single sensor ASIC. To be sure, the environment sensor can be any sensor that is capable of collecting enough information to measure the environment, including ambient light and temperature. In an embodiment, the temperature sensor measures temperatures relative to the LED temperatures. Embodiments in accordance with present disclosure provide the system 100 that can correlate between temperature readings by the temperature sensor and the luminaire temperature. In an embodiment, the environment sensor is also an environment color sensor, which provides the color intensity of the environment ambience. The color intensity of the environment ambience may enable the system to tune up the color intensity reading coming from the color sensors facing the luminaire 112. That is, the system is capable of initializing and tuning up an interface with the luminaires 112. According to an aspect, the cloud server 106 and/or the gateway 102 continuously monitors the information and triggers the initialization and/or tune-up of the luminaires 112 interface based on a change in the information, and/or a change in hardware or software of the luminaire 112, the gateway 102 and/or the sensor subsystem 108.

In general, aspects of the present disclosure describe a method of predicting the half-life of the luminaire based on color. Embodiments in accordance with the present disclosure provide a method for the system to identify and control dimming levels of a plurality of luminaires over time. The method may include the system receiving a plurality of sensor readings associated with the dimming levels of the luminaires over time wherein the plurality of luminaires are connected to a plurality of sensors. In an embodiment, the plurality of sensors is simultaneously connected to at least one gateway, which is capable of controlling the dimming levels of the plurality of luminaires. The method further consists of the forwarding, by the gateway, those received (plural) sensor readings along with power readings of the plurality of luminaires over wired/wireless networks and via Wide Area Network ("WAN") to cloud servers for further processing.

The method includes the recording in memory of information received from a plurality of sensors associated with color contents, color intensities and light sources' environments, wherein the plurality of sensors can be a combination of at least one environment sensor and one color sensor. The color sensor may sense the color contents and color intensities while facing the plurality of luminaires, whereas the environment sensor may monitor the environment by facing away from the plurality of luminaires.

The method includes interfacing by the gateway with a plurality of other control systems and/or devices via at least a wired connection, an Ethernet connection, a wireless connection or a combination thereof. According to an aspect, the gateway receives instructions to control the dimming level of the plurality of luminaires via its dimming interface. The interface present in the gateway may be a backhaul interface running a backhaul protocol. In an embodiment, the backhaul protocol is responsible for delivering instructions to the gateway to control the dimming level of the plurality of luminaires. The method may further include receiving by the gateway, from a plurality of sensors, information regarding color contents, color intensities and the light sources' environments, which is directly associated with the dimming level instructions. The gateway may further include various methods and/or tools to record received instructions.

The method includes communicating and handling a plurality of dimming protocols by the gateway via its dimming interface. In an embodiment, the plurality of dimming protocols may be at least a 0V-10V, 1V-10V, DALI, DMX, digital protocols and analog protocols, and so on.

The method may include controlling a dimming device located inside the plurality of luminaires by the gateway. According to an aspect, controlling the dimming device by the gateway is utilized by the system to change the dimming level and/or the color temperature and/or the RGB/RGBW colors of the plurality of luminaires based on the database of instructions associated with a time schedule. In an embodiment, the gateway receives a set of instructions associated with dimming setups and a plurality of sensor measurements from a plurality of sensors according to a specific moment of any day. The receiving method may record these instructions and a scheduler checks the information on a timely basis and acts on these instructions.

According to an aspect, a method to program the plurality of sensors of the gateway in such a way that the plurality of sensors will provide data only when the color intensities are outside of a predetermined range is provided. In an embodiment, a method to enable scheduling control in ways/ manners that allow measurements to be taken only when environment measurements, as well as the dimming levels, reach certain ranges and within time schedule limitations of the gateway is provided. In an embodiment, the dimming parameters, the sensor parameters, and the reading setups are delivered all or in parts from outside of the gateway via at least a cloud server connected to the gateway. The gateway may be configured to communicate these parameters, store them on the device in a database and manage their life cycle.

The method may include measuring real time power by at least one power meter connected to at least one luminaire, wherein the real-time power measurements correlate 1-1 to the power drawn by the plurality of luminaires at any given moment. The interface between the gateway and the power meter may be a Universal Asynchronous Receiver/Transmitter (UART) or other communication interfaces ("power meter interface").

The method includes receiving continuously by the gateway real-time performance measurements from a plurality of sensors connected with the gateway via the sensor interface and power measurements from a power meter via a power meter interface. According to an aspect, the gateway further includes a method, which compresses and sends these said measurements to at least one cloud server. The compressed format may include a baseline message set and an update message set. In an embodiment, the two sets of messages are unique and separate. The baseline message set may include the full sensor readings, power level readings and current dimming state. The update message set may include changes or differentiations from the previous message set. The gateway may further include a method to identify major changes that require a baseline message set to be sent. Such major changes may include a change in scheduled dimming level and/or a change in the environment reading that requires a new baseline set. According to an aspect, the gateway includes a method to send the updates message set on regular intervals. The updates message set may include readings that are significantly different from the previous set. In one embodiment, the updates message set recognizes significance in reading changes based on a table of sensor ranges appropriate to the specific luminaire that is set by the cloud servers. In an embodiment, sensor readings from the plurality of sensors can be averaged over the time interval between two consequent updates.

According to an aspect, the cloud servers include methods for continuously receiving a plurality of performance measurement information arriving from the gateways. The pluralities of cloud servers may include methods to perform correlation between the received plurality of performance measurements and the specific luminaire characteristics controlled by the gateways. In an embodiment, the method includes derivations of at least one lumen prediction graph by the plurality of cloud servers. The prediction may be based on the lumen prediction graph, that is, the theoretical lumen degradation prediction graph in ideal known conditions estimated by the luminaire manufacturer and the gateway measurements. In a separate embodiment in accordance with the present disclosure this correlation information can accurately predict $L_{70}$ and $L_{50}$ for the specific luminaire in its current environment.

The method may include predicting an accurate lumen degradation graph by the cloud server's system. The predictions of the lumen degradation graphs may be based on timely correlations between the dimming state changes and the real time sensor readings of the environment and color sensors, as well as AMP levels used by the luminaires. In an embodiment, the cloud server uses the correlated information and predictions to recommends alternative dimming schedules that will extend the half-life ($L_{50}$) of the luminaires in the system, while maintaining expected luminosity at the appropriate levels.

Embodiments in accordance with the present disclosure provide the system 100 that is capable of predicting accurate lumen degradation or depreciation graph for the specific luminaires 112 attached to the system 100. The prediction of the lumen depreciation graph may be based on correlation between dimming state changes and real time sensor readings of the environment and color sensors, as well as the AMP level used by the luminaire 112. Embodiments in accordance with the present disclosure provide the system 100 that is capable of using these predictions to recommend alternative schedules to extend the half-life ($L_{50}$) of the luminaires 112 in the system 100 while maintaining expected luminosity at the appropriate level.

According to an aspect, the system 100 is capable of providing reverse predictions in which based on a given luminosity dimming schedule for the specific luminaires 112 in the system 100, and based on real time sensor readings, the system 100 can accurately predict the half-life of the luminaire 112.

Figure 4:
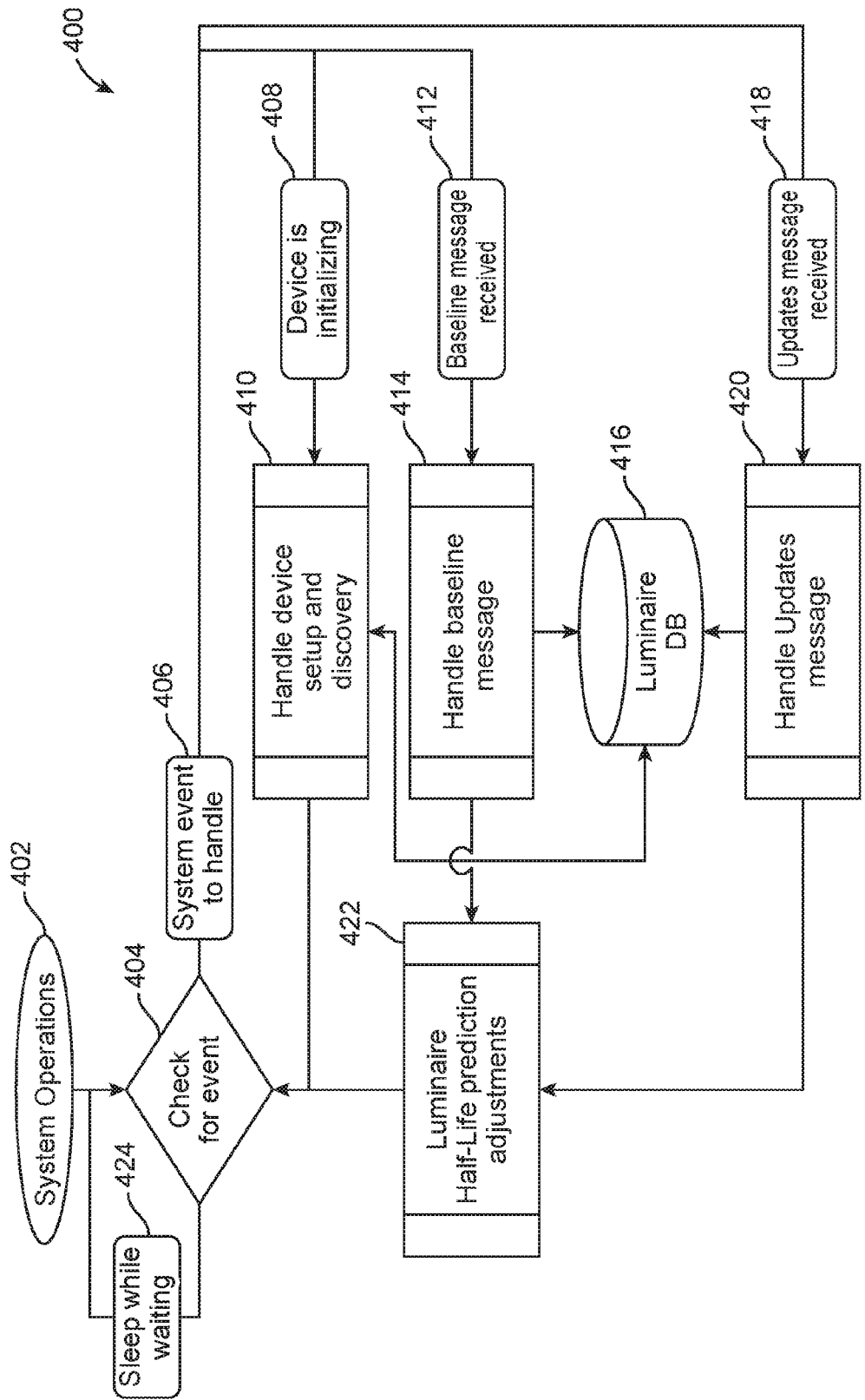
FIG. 4 illustrates a flow chart of a system handling a procedural global event, according to an aspect.

FIG. 4 illustrates a flow chart of an aspect and a method 400 of a system 100. According to an aspect, system 100 is configured to perform various high-level system operations 402 via the server 106 (see FIG. 1), and in particular is configured to predict lumen depreciation and/or life expectancy, and to make correlations between the two. According to an aspect, at step 402, initiation of the system operations 402 may begin. The at least one gateway may initialize operation of the system based on at least one communication message exchanged with the server. At step 404, the system checks whether there are events that need to be handled. If the result of step 404 is that there are no events that need to be handled by the system, the operation goes to step 424, during which the system may go back to sleep. If the result of step 404 is that there are events that need to be handled by the system, the operation goes to step 406. At step 406, the system checks different events that need to be handled. According to an aspect, at least three different types of events 408, 412, and 418 may be present. As illustrated in FIG. 4, the events may include a first event at step 408 ("Device is initializing"), a second event at step 412 ("Baseline message received"), and a third event at step 418 ("Updates message received").

At step 408, the system may identify the first event, which may be to initialize and/or handle a current device/luminaire, then move to step 410. At step 410, a new device/a new luminaire may be discovered and properly set-up. If the device is already initialized, the system may look for a baseline message at step 412 and/or an update message at step 418.

Thus, at step 412, the system recognizes the second event, which may include receiving baseline messages. The baseline messages include but are not limited to initial settings and/or readings from the dimming control device, sensor subsystem and/or power meter related to the specific luminaire(s). At step 414, the system may handle the baseline message(s) and simultaneously forward the baseline message(s) to a luminaire and/or driver database (DB) 416 and/or step 422. According to an aspect, the baseline message(s) are collected/recorded in the luminaire and/or driver DB 416, which is a repository to receive and store information from the sensor subsystem and/or power meter and/or aspects of the individual luminaire/LED. At step 422, the baseline message(s) may be used, in conjunction with all other data collected in other steps, to establish and/or update/adjust the half-life and/or end-of-life prediction and requirements for the specific luminaires. The luminaire database 416 is configured to receive and store the information collected from the system and/or luminaires.

Alternatively and/or simultaneously, at step 418, the system recognizes the third event, which may include receiving the updates message(s). The updates message(s) include but are not limited to settings and/or readings from the dimming control device, sensor subsystem and/or power meter related to the specific luminaire(s) that are received at a point in time other than the initial settings and/or readings received with the baseline messages and are essentially updates to previously recorded settings and/or readings. At step 420, the system may handle/process the updates message 418 and then forward the updates message simultaneously towards the luminaire and/or driver DB 416 and step 422. According to an aspect, the updates message is received and recorded in the luminaire and/or driver DB 416. At step 422, the updates message(s) may be used, in conjunction with all other data collected in other steps, to establish and/or update/adjust the half-life and/or end of life prediction and requirements for the specific luminaires. According to an aspect, the third event performed at step 418.

After handling incoming messages of any type, such as, for example, the baseline messages or the updates messages (see, for instance, FIG. 7), the measurement updates or changes may be transferred to and recorded in the luminaire and/or driver DB 416. According to an aspect, the luminaire and/or driver DB 416 also records the handling of the device setup and/or the device discovery. (See, for instance, FIG. 4). According to an aspect and as found in step 422, after the handling of the baseline message and the updates message at steps 412 and 418, the system may predict the luminaire half-life or adjust its predictions of the luminaire half-life based on the updates, and as will be discussed in greater detail hereinbelow with reference to FIG. 8. A person of ordinary skill in the art would appreciate that changes in the dimming schedule of any luminaire will impact the luminaire's half-life expectancy, therefore, over time and based on usage, the predictions will change and become more accurate to the specific point-in-time of the measurements.

According to an aspect, the server utilized in the system operations 402 is at least one of a cloud server and a local server. In an embodiment, the system performs the system operations 402 via only the cloud server (see, for instance, FIG. 5.) The cloud server may primarily be in a sleep mode while waiting to check for the presence and/or status of events. According to an aspect, the cloud server may be in a reactive mode, during which it waits for the occurrence of events. The cloud server may actively/regularly wake up from its sleep mode, to check/assess whether any of the events exist 404. According to an aspect, the server manages each of the first, second and third events at different stages/through different processes. According to an aspect, the first event 408 is managed/handled during a set up and discovery process, illustrated in FIG. 4 as 'Handle device setup and discovery' 410. (See, for example, FIG. 5.) The second event 412 may occur when a baseline message has been received, and is illustrated in FIG. 4 as 'Baseline message received'. The handling of baseline messages/'Baseline Message' types of messages is described in further detail hereinbelow, with particular reference to, for example, FIG. 6. The third event 418 may be associated with the receipt of message updates, and is illustrated in FIG. 4 as 'Updates message received' 418. Creation of updates messages/'Updates Message' types of messages is described in further detail hereinbelow, with particular reference to, for example, FIG. 7.

Figure 5:
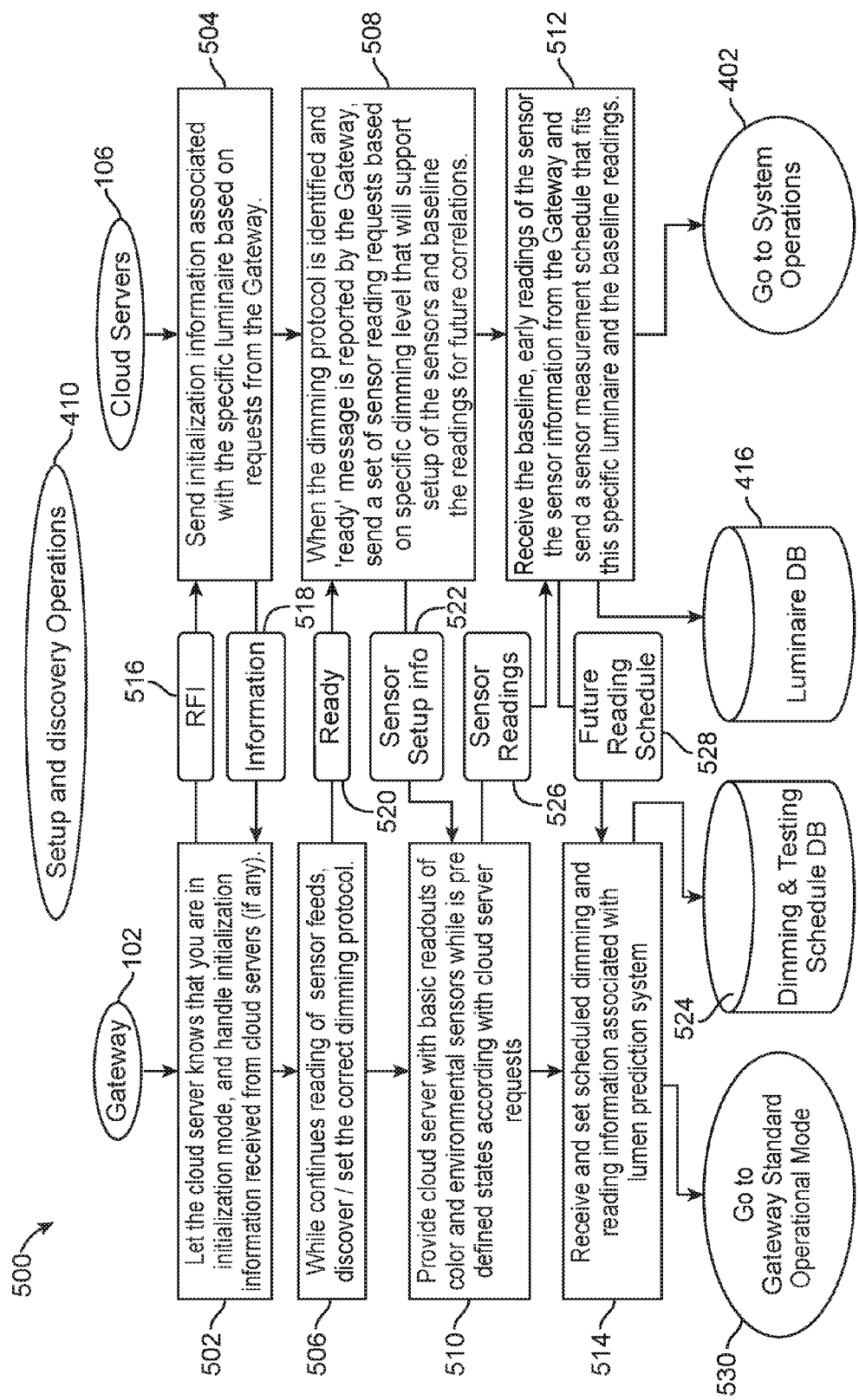
FIG. 5 illustrates a flow chart of a device setup and discovery stage of a system, according to an aspect.

FIG. 5 depicts an embodiment 500 of the system 100 handling of device setup and discovery operations starting at step 410. According to an aspect, the step 410 includes the discovery and proper set-up of the device/the luminaire. The setup and discovery operations may include a flow of information that occurs as two separate parts of the system 500, each including a request for information (RFI) 516 flow to server 106 and a flow from the server 106 of Information 518, which may include minimal initialization information from a particular controlled luminaire (as described above with reference to, for example, FIG. 1).

According to an aspect, the first event after turning on a gateway 102 may include the RFI 516 being sent/transmitted from the gateway 102 to the server 106. As illustrated in FIG. 5, at step 502, the gateway 102 may send the RFI 516 towards the server 106. Thus, the gateway 102 may ask the server 106 to provide the minimal initialization information 518. According to an aspect, if the server 106 is already familiar with the particular luminaire, the first event may include providing more information 518 based on this knowledge/familiarity/association with the particular luminaire. At step 504, the cloud server 106 may return the initialization information 518 to the gateway 102, then proceed to step 506. At step 506, the gateway 102 may continue to read sensor feeds, and identify/discover/set the correct dimming protocol/level. According to an aspect, once the gateway 102 has set the appropriate dimming protocol for the luminaire, a "ready" message 520 is sent to the server 106. The ready message 520 may include identifying the luminaire, the luminaire's dimming protocol and sensor information, as collected during the dimming protocol test/discovery 506 by the gateway 102, as described in greater detail in the '263 Application. In an embodiment, the server 106 responds with dimming and sensor information 522 associated with the setup of the sensors for baseline and for tune-up. At step 510, the gateway 102 may set the luminaire to a pre-defined state and collect the reading of the sensors, such as, for example, the color sensors and the environmental sensors. According to an aspect, the information collected is sent to the server 106 as part of a 'Sensor Readings' message 526. The information collected may include the baseline or early readings of the sensor information. The cloud servers 106 may then send back a future reading schedule 528 that includes final tune-up information, a schedule for dimming, and/or a sensor measurement schedule for measurements that need to be done on a regular basis. While sensor measurements may begin upon installation of the luminaire, sensor measurements would not typically impact the predictions of life expectancy until the device had achieved about 1000 hours of service or operation. In other words, the calibration or calculation of the real-world life expectancy of the particular luminaire 112 would not be impacted until after the luminaire had been working for 1000 hours. According to an aspect, at step 514, the gateway receives and sets scheduled reading and dimming information associated with the half-life prediction system/lumen prediction system. The server 106 may update the luminaire DB 416 and continue to system operations 402 (and FIG. 4). In an embodiment, the gateway 102 records the scheduling information in a dimming and testing schedule DB 524. The gateway 102 may continue to the gateway standard operational mode 530 (and FIG. 6).

Figure 6:
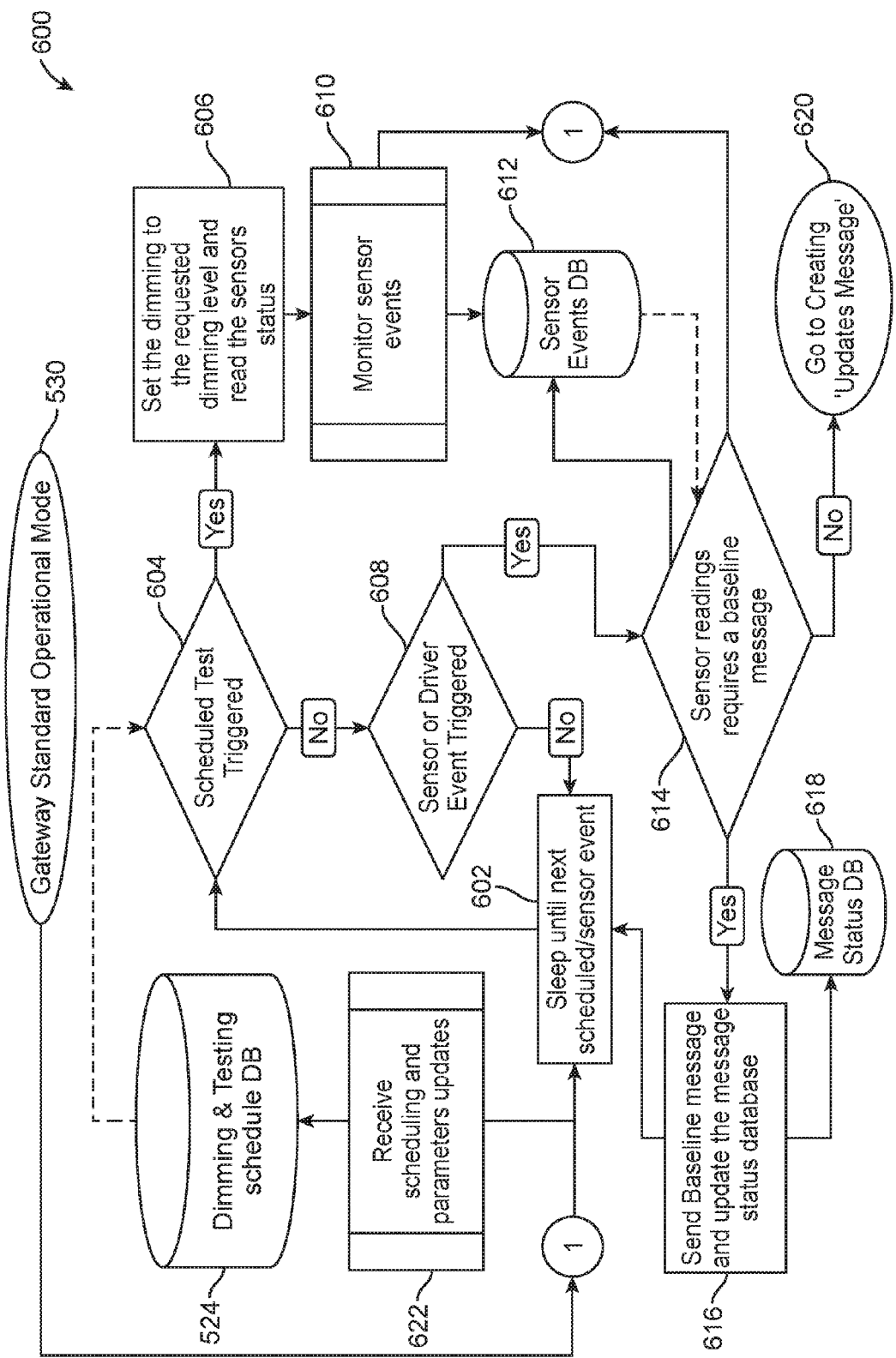
FIG. 6 illustrates a flow chart of a system handling a gateway Standard Operational Mode, according to an aspect.

FIG. 6 illustrates an embodiment 600 of the gateway standard operation mode 530. According to an aspect, at step 602, the gateway is primarily in a sleep mode during which it waits for one or more events to occur. In an embodiment, each event may include setting a new dimming level and waiting for a single sensor event or multiple sensor events. According to an aspect, the types of the events the gateway may wait to occur include two types. The first type of event may be associated with existing dimming and testing, including, for example, at a specific/designated time, setting a specific dimming level, and waiting for a set of sensor readings. For instance, at step 622, a "receive scheduling and parameters updates" process 622 may update the dimming and test schedule DB 524 and may also refresh a sleeping timer (not shown) for the gateway to wake at the next appropriate test schedule. According to an aspect, the second type of event includes current/present sensor readings that need to be read and processed.

When the gateway is out of sleep mode/initialized, the gateway may receive a scheduling message from the cloud servers as seen at step 622. The scheduling message may include parameters to populate the dimming and test schedule DB 524. At step 604, the gateway may check for any scheduled tests, which may be waiting in the dimming & testing schedule DB 524. For instance, when the scheduled test is triggered at step 604, the gateway may set the dimming level to a requested lumen/light percentage. According to an aspect, the gateway does not process or handle events that are not planned for and/or scheduled by the dimming & testing schedule DB 524. If at step 604 there is no scheduled testing event waiting, e.g., 'No', then the operation moves to step 608, where the gateway checks for any triggered sensor events as described in greater detail below. If at step 604, the scheduled test is triggered, 'Yes', the gateway standard operational mode 530 proceeds/moves to step 606 where the gateway sets the dimming protocol to a requested dimming level and reads the sensor status. In an embodiment, after step 606, the gateway performs step 610 where the gateway starts to monitor sensor and/or driver events—e.g., has the sensor(s) or driver/dimming control device changed?

Scheduled dimming level and sensor measurements are conducted at step 606, and include a plurality of sensor readings that must be completed at step 610. The sensor measurement event requests can be, for example, wait for the temperature readings to reach a specific level/range, wait for the AMP reading to reach a specific range, read color intensity for a plurality of colors multiple times, and the like. Such event data is recorded in the sensor and driver events DB at 612. In an embodiment, when a sensor event occurs, there can be multiple outcomes. For instance, if the sensor reading is the last sensor reading required for this specific scheduled dimming measurement, the gateway may make a decision if the set of measurements requires a new Baseline message at step 614, and if "No", moves to creating an Updates message at step 620. In the case of a baseline message, the gateway may format a new baseline message at step 616 and send it to the server, (not shown), update the schedule to wait for the next dimming schedule and go to sleep at step 602.

The updates message is described in further detail hereinbelow, and in accordance with FIG. 7. In an embodiment, after the updates message is handled, the gateway goes back to sleep (see, for instance, FIG. 4). The third case may occur when there are more events associated with/chained to the current scheduled dimming that the gateway must wait for. In this case, the gateway may go to sleep/enter a sleep mode while waiting for those events. According to an aspect, before the gateway goes to sleep to wait for the other events, the current event is recorded in the Sensor Events DB 612, where all accumulated and scheduled events are recorded for future processing.

At step 608, the gateway may check for any triggered sensor events. If the response is 'Yes', than the operation moves to step 614. If the response is 'No', then the operation may go back to the step 602 and wait for an event to occur. According to an aspect, at step 614, the gateway may decide if the sensor reading requires baseline messages. If the response is 'Yes,' then the operation moves to step 616. If the response is 'No', then the operation moves to step 620. In an embodiment, the decision to move to one of the step 616 and the step 620 is based on multiple factors, which may primarily include differences between the previous baseline message and the current changes in the baseline messages. According to an aspect, the operation may also move to one of the step 616 and the step 620 if there is no prior baseline message. In an embodiment, at step 616, the gateway sends baseline messages and then moves to step 618, where the message status database is updated. When there is a need for an updates message, the gateway may go to step 620. When message generation/creation of updates message is complete/done, the gateway may move to the step 602 and wait for the next event to occur.

In an embodiment, each event may include setting a new dimming level and waiting for a single sensor event or multiple sensor events. For every event that occurs, the operation may move to step 612 where the gateway updates the sensor events DB. According to an aspect, monitoring sensor events occurs in parallel/in the background by step 610, while the gateway proceeds to step 602 where the gateway waits for an event to occur.

Figure 7:
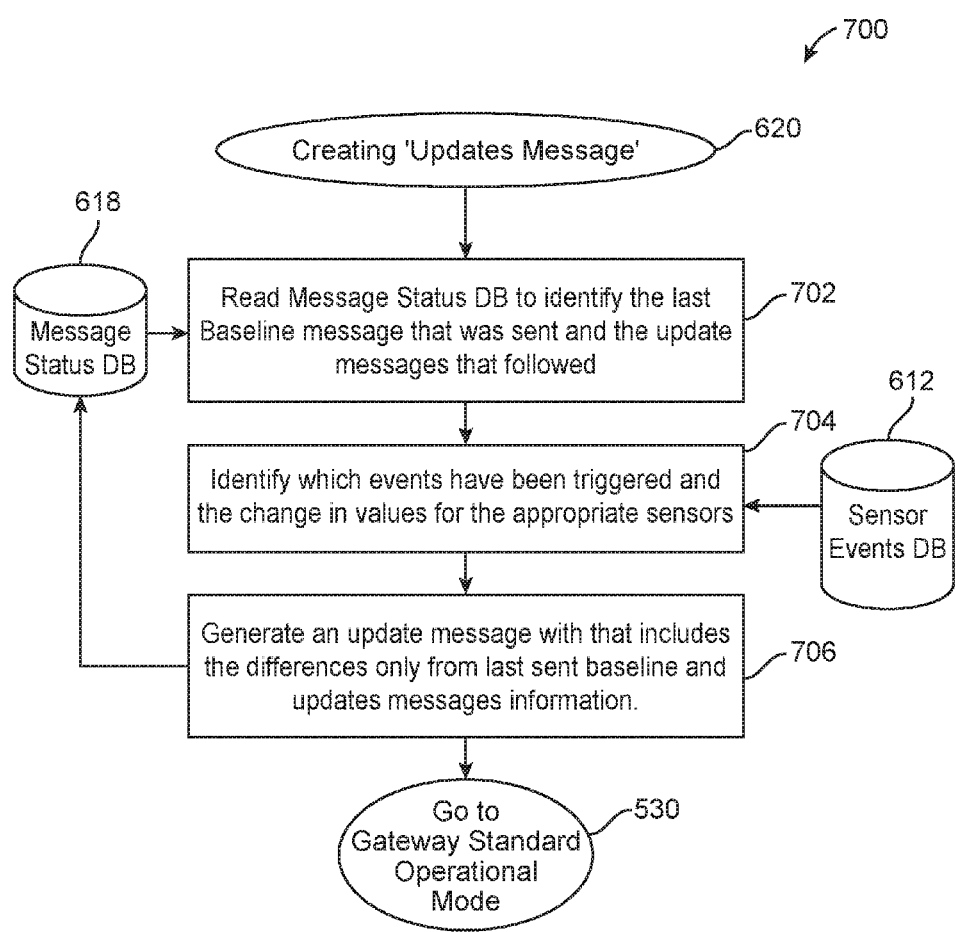
FIG. 7 illustrates a flow chart of a system creating an 'Updates Message,' according to an aspect.

FIG. 7 illustrates an embodiment 700 of the creating 'Updates Message' 620 described hereinabove and illustrated in FIG. 6. According to an aspect, the creating the Updates Message may depend on the accumulation of all prior messages sent and recorded in the Message Status DB. Based on past/previous messages and current event information stored in the events DB 612, the gateway may identify sensor readings that have changed and may format a message to include those readings only, and send this message to the cloud server. According to an aspect and with reference again to FIG. 6, once this message is sent, the message status DB 618 may be updated for future analysis, and the gateway may go back to sleep and wait for the occurrence of any next events as part of the standard operational mode 530.

According to an aspect, and as illustrated in FIG. 7, at step 702, after receiving messages from the message status DB 618, the gateway may identify the last baseline message sent and the updates message that followed. At step 704, the gateway may identify which of the events has been triggered and what changes have taken place in the values for the appropriate sensors, after receiving information from the sensor events DB 612. According to an aspect, at step 706, the gateway generates an updates message, which may include only the differences between the previously sent/last sent baseline message and the accumulated updates message information, and the current sensor readings 612. The process of creating updates message 620 may proceed to step 530, in which the gateway moves into the standard operational mode 530. (See, for instance, FIG. 6.) According to an aspect, at step 706, the gateway may simultaneously update the message status DB 618.

Figure 8:
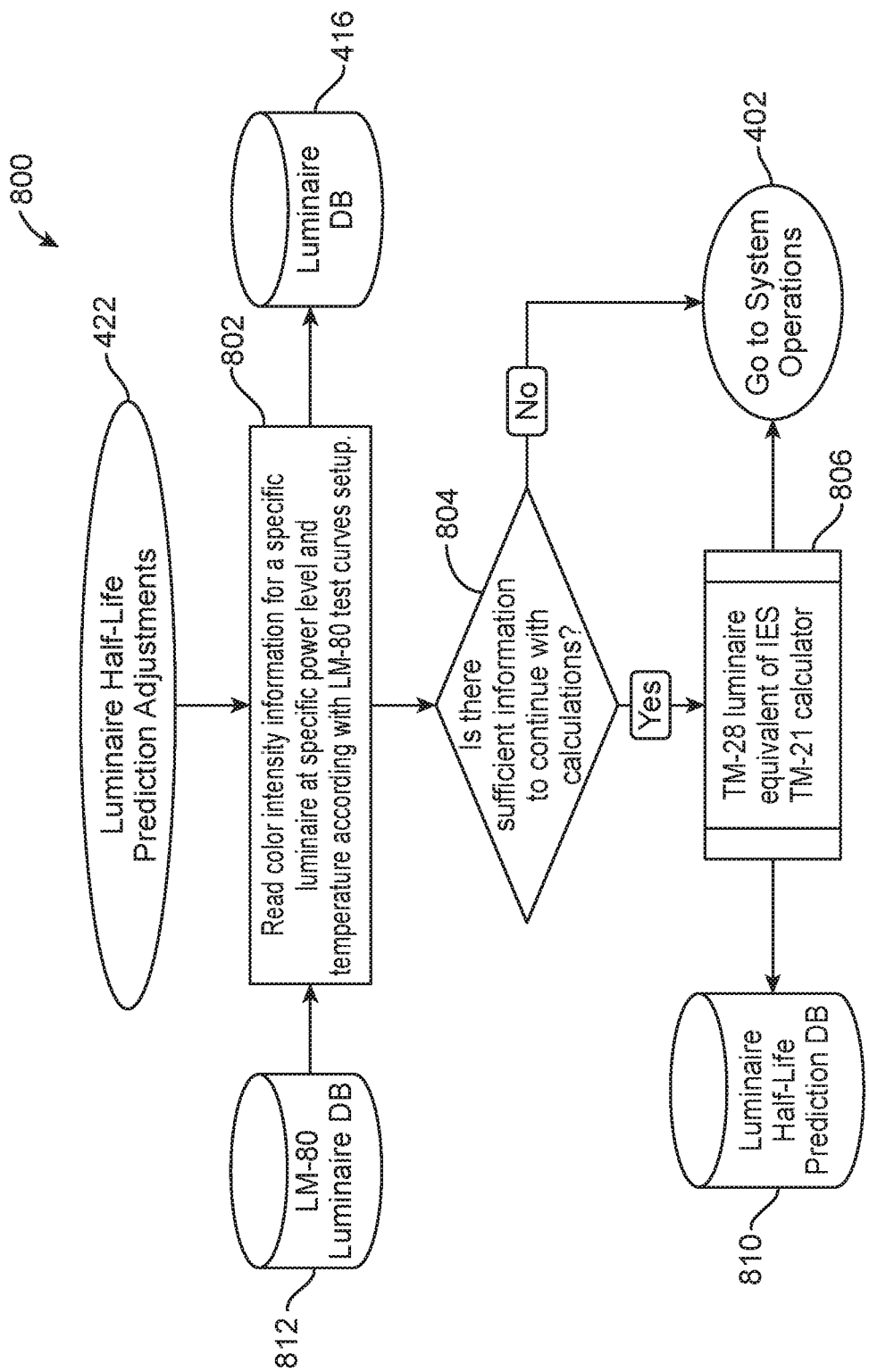
FIG. 8 illustrates a flow chart of a system including cloud servers calculating specific luminaire half-life prediction information, according to an aspect.

FIG. 8 illustrates an embodiment 800 of the system 100 including cloud servers (not shown) that are configured to calculate specific luminaire half-life prediction information.

According to an aspect, in order to calculate intensity depreciation, color sensors are utilized to demonstrate readings and/or measurements that are linearly correlated to a luminaire light intensity depreciation graph. The color sensors may be consistent in their readings across a plurality of sensors, such that when, for example, a LED light intensity reading is changing by X %, the sensor color intensity reading changes in the same X %. In an embodiment, the sensor readings 'total intensity readings' are not equivalent to the actual lumen emission by the luminaire device that the sensors are attached to, which is usually the case. A person of ordinary skill in the art would understand that when this relationship is presented in a graphical format, and exponential graphs are linearly correlated, a change in one (the curve) can fit the curve (change) in the other directly.

According to an aspect, the system 800 includes an LM-80 luminaire DB 812. The LM-80 luminaire DB 812 may include the manufacture's specification information as described in detail hereinabove, and the manufacturing data for a plurality of LED light sources, which when paired with a luminaire's chip running temperature, may provide a theoretical predictive life calculation. According to an aspect, testing the luminaire to LM-80 standards and utilizing any LM-82 data may help to create the luminaire DB 416. The luminaire DB 416 may include information specific to the fitting and dimming, as well as to the sensor reading ranges, etc., associated with the specific luminaire. According to an aspect, the luminaire DB 416 includes all past sensor readings, with associated times of reading, dimming level, temperatures and current readings. The sensor, temperature, and current readings may be normalized based on the original readings received upon installation of the luminaire.

According to an aspect, the luminaire half-life prediction adjustment 422 begins at step 802. At step 802, the cloud servers may read the color intensity information for a specific luminaire at a specific power level and temperature after receiving information from the LM-80 luminaire DB 812 and the luminaire DB 416. The luminaire DB 416 may include information that is specific to the fitting and the dimming, as well as to the sensor reading expected ranges, etc., associated with the specific luminaire. According to an aspect, the luminaire DB 416 includes all past sensor readings, with associated times of reading, dimming levels, temperatures and current readings—each of which may be accumulated, as depicted in FIGS. 4-7. The sensor, temperature, and current readings can be normalized based on the original readings received upon installation of the luminaire, as described hereinabove, with reference to FIG. 5. According to an aspect, the multiple sensor readings associated with color intensity are normalized using an equation, where the present reading is divided by the initial reading taken when the luminaire was first initialized.

At step 804, the cloud servers may decide if the collected accumulated information is sufficient to continue with calculations. If the response is 'Yes', then the operation may move to step 806. If the response is 'No', then the operation may move to step 402, which is the system operation's main loop and as shown in FIG. 4. According to an aspect, the system 800 includes a TM-28 luminaire. According to an aspect, the TM-28 luminaire is the luminaire equivalent of an (Illuminating Engineering Society) IES TM-21 calculator, and the TM-28 takes data collected over time in the luminaire DB 416 for use as test samples. This information may be plotted after normalization of the information/data of the TM-28 luminaire, which may facilitate accurate prediction of lumen maintenance over time. The standard information within LM-80 DB 812, provided by the LM-80 manufacturer, is insufficient and may be dependent on a fixed temperature and the current state of the luminaire for the readings. In an embodiment, the system 800 may use the sensor readings at specific temperatures and dimming levels to extrapolate the place of the luminaire color intensity readings on the LM-80, given curves of this specific luminaire. Using this information, and knowing the time period elapsed between readings, and after correlating this information with previous readings, the system 800 can extrapolate a new curve that more accurately represents the current luminaire's behavior and report this new curve and/or new/updated half-life prediction to a user. This new curve may be based on information collected from the system and sensor subsystem of the luminaire's true environment and usage over time, such as, for example, dimming schedule, power and temperature levels, degradation of the lens, and degradation of the luminaire's physical fittings. According to an aspect, this information is stored in the luminaire half-life prediction DB 810 for future use (e.g., to be provided to the user to modify, for instance, a replacement schedule), and the next step may include waiting for the next event as part of the system operations 402. According to an aspect, at step 806, the TM-28 luminaire equivalent of IES TM-21 calculator takes data that was collected over time in the luminaire DB for a test sample and plots this information after normalization into TM-28. This step may allow for prediction of lumen maintenance over time. The information generated in step 806 may be stored in the Luminaire Half-life Prediction DB 810 for future use. According to an aspect, it is possible for the server to store and access information collected from large numbers of luminaires that are not limited in geographical location. In other words, it is possible for the system contemplated herein to collect information/data from installations around the globe, and to thus compare data received from luminaire systems installed and operating in China, the United States, Japan, and the like. Providing new curves and/or new/updated half-life predictions to the user (e.g. the manufacturer of the specific luminaire and/or other luminaire manufacturers) allows compilation and comparative analysis of data collected across diverse regions at various environments, barometric pressures, humidity, electrical grid conditions, locations and the like, all of which impacts actual performance of the luminaire.

Figure 9:
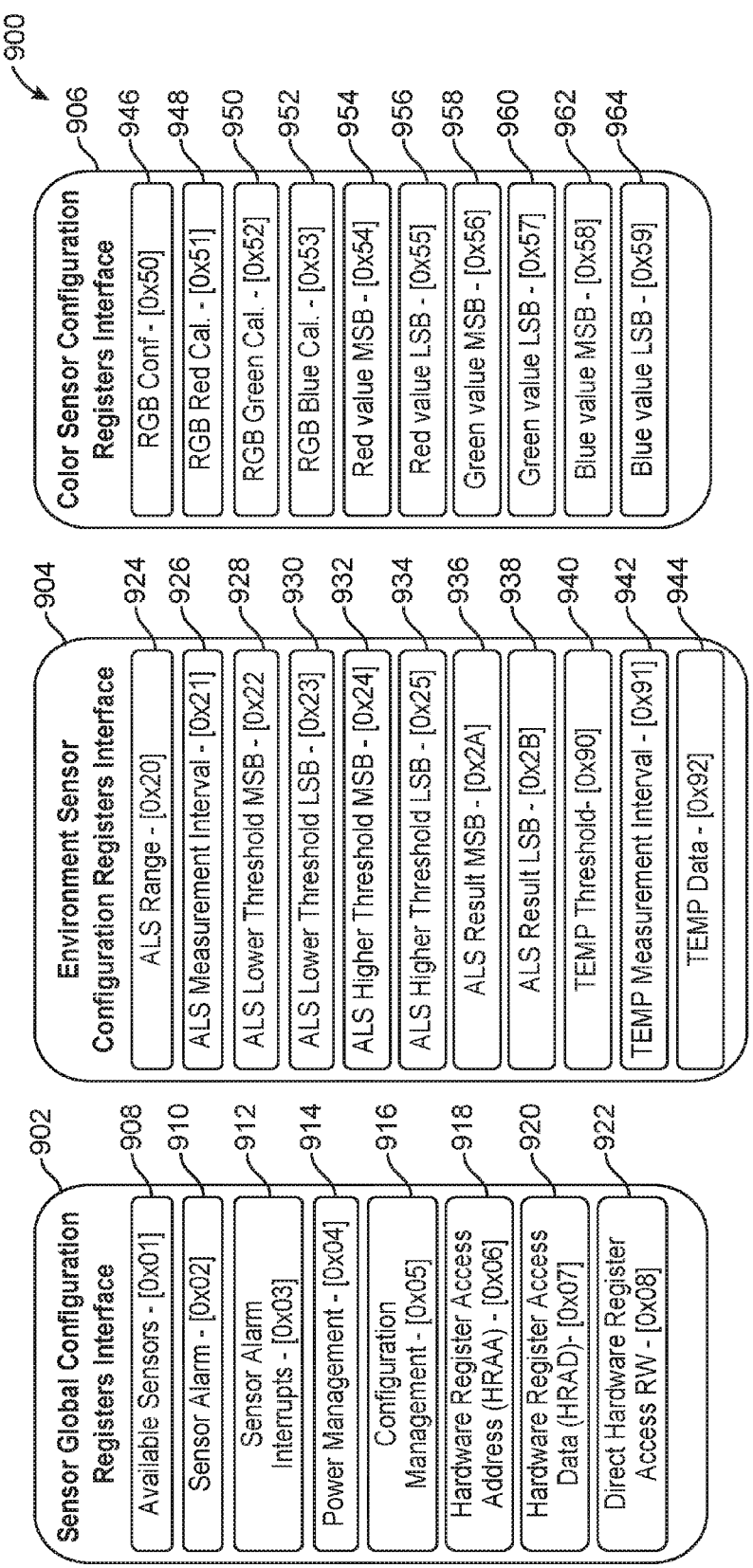
FIG. 9 illustrates a diagram of a sensor interface data structures of a system, according to an aspect.

FIG. 9 illustrates an embodiment 900 of the sensor interface data structures. According to an aspect, the sensor interface data structure includes the Sensor Global Configuration Registers Interface 902, the Environment Sensor Configuration Registers Interface 904, and the Color Sensor Configuration Registers Interface 906. Each of the data structures 902, 904, 906 may be memory mapped registers that include an application. In order to send information via a memory mapped register, the applications of each of the registers' interface 902, 904, 906 may write to a memory address allocated for the respective register. To receive information, the application may read the memory address allocated for the specific register. In FIG. 9, the relative address of each register is identified/labeled/marked in boxed brackets [ ]'. In an embodiment, the size of each address is one byte (8-bit).

According to an aspect, the Sensor Global Configuration Registers Interface 902 may include a plurality of global configuration registers configured to perform a plurality of activities. According to an aspect, available Sensors [0x01] 908 identify which sensors are available for the particular device. The Available Sensors [0x01] 908 may show a Temperature Sensor (TEMP), an Ambient Light Sensor (ALS), a color sensor (RGB), a Motion detector sensor based on PIR, a Motion detector and direction sensor based on frame capture, and the like. Sensor Alarm [0x02] 910 may show which sensors have generated an interrupt. In an embodiment, Sensor Alarm Interrupts [0x03] 912 enables and/or disables interrupt from each available sensor whenever an alarm is generated. Power Management [0x04] 914 controls power up and/or power down functions for the different sensors. Configure Management [0x05] 916 may store register values in a non-volatile memory. Hardware Register Access Address (HRAA) [0x06] 918 may hold the address for accessing the internal hardware registers of sensors, and Hardware Register Access Data (HRAD) [0x07] 920 may hold the data to load and/or store in the address given in the register HRAA [0x06] 918. The Sensor Global Configuration Registers Interface 902 may include Direct Hardware Register Access RW [0x08] 922, and if it holds a value "1", then the data in the register HRAD [0x07] 920 may be written to the address in register HRAA [0x06] 918. If Direct Hardware Register Access RW [0x08] 922 holds a value "0", then the data pointed to by register HRAA [0x06] 918 may be read in register HRAD [0x07] 920.

As illustrated in FIG. 9, the Environment Sensor Configuration Registers Interface 904 may include a plurality of environment specific sensor registers. According to an aspect, the Environment Sensor Configuration Registers Interface 904 may include ALS Range [0x20] 924, and if it holds a value "1", the ALS Range [0x20] 924 may enable a high measurement range of 1000-10000 Lux for the ALS. If ALS Range [0x20] 924 holds a value "0", then a low measurement range of 1-1.500 Lux may be enabled. ALS Measurement Interval—[0x21] 926 may record the elapsed time between subsequent ALS measurements. ALS Lower Threshold MSB [0x22] 928 may display Most Significant Byte (MSB) for ALS lower threshold for triggering an alarm. In an embodiment, ALS Lower Threshold LSB [0x23] 930 displays List Significant Byte (LSB) for ALS lower threshold for triggering an alarm, and ALS Higher Threshold MSB [0x24] 932 displays MSB for ALS higher threshold for triggering an alarm. According to an aspect, ALS Higher Threshold LSB [0x25] 934 displays LSB for ALS higher threshold to trigger an alarm. ALS Result MSB [0x2A] 936 may display MSB for ALS measurement results. According to an aspect, ALS Result LSB [0x2B] 938 may display LSB for ALS measurement results. TEMP Threshold [0x90] 940 may display upper threshold value for when an interrupt is triggered. According to an aspect, TEMP Measurement Interval [0x91] 942 displays a temperature measurement interval in seconds, and TEMP Data [0x92] 944 displays temperature values in degrees Celsius.

The Color Sensor Configuration Registers Interface 906 may include a plurality of color specific sensors. In an embodiment, the colors are Red, Green and Blue (RGB). According to an aspect, RGB Conf. [0x50] 946 controls both calibration configuration and report when a sensor reading is available. RGB Red Cal. [0x51] 948 may display a calibration constant for red value from RGB sensor, RGB Green Cal. [0x52] 950 may display a calibration constant for green value from RGB sensor, and RGB Blue Cal. [0x53] 952 may display a calibration constant for blue value from RGB sensor. According to an aspect, Red Value MSB [0x54] 954 displays MSB result of Red value from RGB sensor. Red Value LSB [0x55] 956 may display LSB result of Red value from RGB sensor. Green Value MSB [0x56] 958 may display MSB result of Green value from RGB sensor. According to an aspect, Green Value LSB [0x57] 960 displays LSB result of Green value from RGB sensor. Blue Value MSB [0x58] 962 may display MSB result of Blue value from RGB sensor. Blue Value LSB [0x59] 964 may display LSB result of Blue value from RGB sensor. To be sure, a person of ordinary skill in the art can appreciate that any of a plurality of colors can be used for color intensity measurements. The sensor chosen may depend on the LED/luminaire color utilization. According to an aspect, luminaire devices may include designs that are based on preferences to emit specific colors, and the color sensor used in each case may be based on those colors. The RGB provided herein is illustrative, and other arrangements and colors are contemplated by the disclosure.

Figure 10:
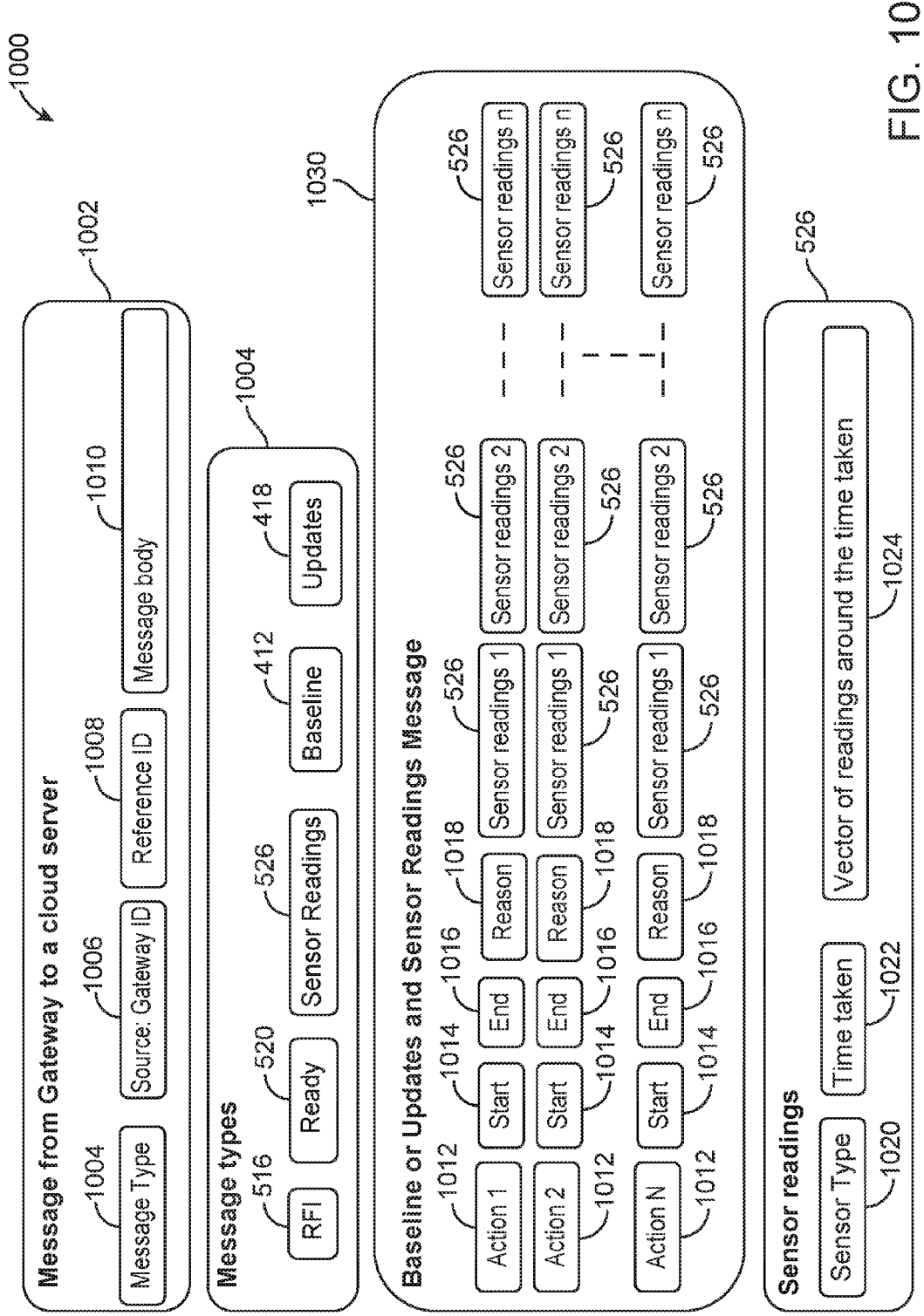
FIG. 10 illustrates a diagram of a message structure for messages delivered in the system from a gateway to cloud servers, according to an aspect.

FIG. 10 illustrates an embodiment 1000 of a message structure for messages delivered from the gateway to the cloud servers. In an embodiment, the message 1002 going to the cloud server is of a single structure. This structure may include Message type 1004, the sender gateway unique identification (Source: gateway ID) 1006, a unique Reference ID 1008 and the Message body 1010. According to an aspect, the Message type 1004 informs the receiver about the type of the message. The reference ID 1008 may be an internal number that is used when there is a conversation between the cloud servers and the gateway. The message body 1010 can be a baseline message or an updates message, and may be structured the same in both cases.

In an embodiment, 'Message types' 1004 is a 'Request for Information' (RFI) 516, which is sent upon initialization of the luminaire. A 'Ready' message 520 may be sent during initializations of the luminaire after discovering the dimming protocol, and when the gateway is ready for further instructions. According to an aspect, sensor readings message 526 is sent to the cloud servers during the initialization period. The 'Baseline' 412 and the 'Updates' 418 message types may be used when sending baseline or updates messages that are based on the cloud servers prior scheduled sensor readings by the specific gateway.

In an embodiment, the 'Baseline or Updates and Sensor Readings Message' 1030 is a 'Message body', which may be sent for the baseline 412, updates 418 and sensor readings 526 message types. According to an aspect, the message structure is the same. For every 'action' 1012, which may be a dimming level set, there is 'Start' 1014 which is the actual start time, 'End' 1016 which is the time the action was terminated, 'Reason' 1018 which is why the action terminated, and sensor readings for all sensors participating in the action as they were scheduled by the cloud server. In an embodiment, the 'Reason' 1018 is success or failure, which may occur for multiple reasons.

The sensor reading 526 part of the message may include a 'Sensor type' 1020 field to indicate the sensor reading, such as, for example, TEMP, ALS, and RGB. In an embodiment, the sensor reading 526 includes a 'Time taken' 1022 field to indicate when the sensor reading 526 was taken, and a 'Vector of readings' 1024, which includes multiple readings centered around the 'Time taken' 1022 field. In an embodiment, the number of readings can be based on the sensor type. According to an aspect, the number of readings is three, including shortly before the 'time taken' 1022 reading/field value, at the same time of the 'time taken' 1022 field value, and shortly after the 'time taken' 1022 field value.

Figure 11:
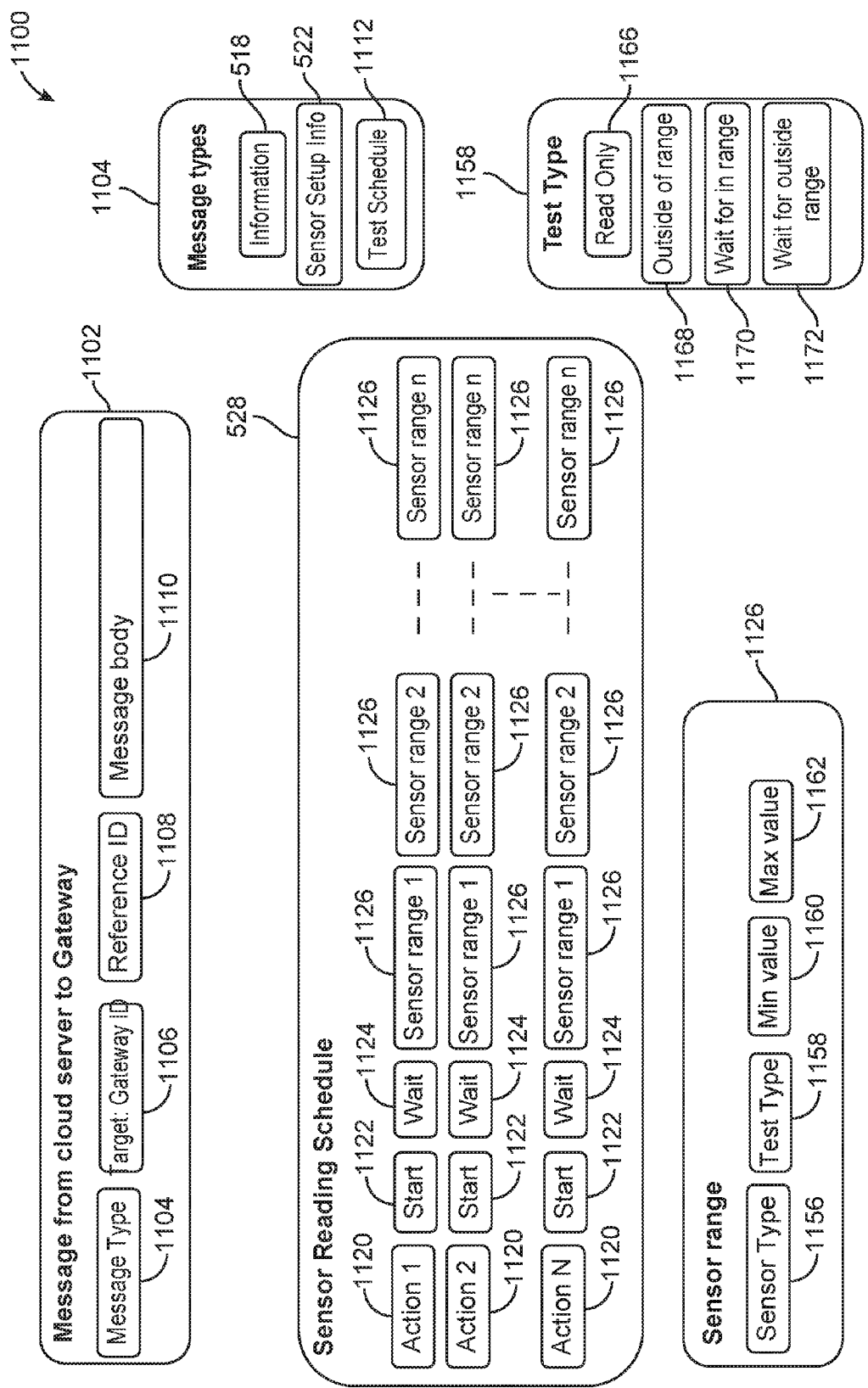
FIG. 11 illustrates a diagram of a message structure for messages delivered in the system from the cloud servers to the gateway, according to an aspect.

FIG. 11 illustrates an embodiment 1100 of a message structure for messages delivered from the cloud server to the gateway. In an embodiment, the structure of the message 1102 is constant. This structure may include message types 1104, a target gateway unique identification 1106, a unique Reference ID 1108 and the message body 1110. According to an aspect, the message type 1104 lets a receiver know what type/kind of message it is. The reference ID 1108 may be an internal number that is used when there is a conversation/communication between the cloud server and the gateway. According to an aspect, the message body 1110 is a Sensor Reading Schedule 528.

In an embodiment, the Message types 1104 are 'Information' 518, 'Sensor Setup Info' 522 and 'Test Schedule' 1112. The 'Information' 518 and the 'Sensor Setup Info' 522 messages may provide the gateway with information about valid ranges for sensor readings at different dimming levels. According to an aspect, the Message body 1110 is a 'Sensor Reading Schedule' 528 that is a baseline for the gateway in its internal measurement and initialization cycle. The gateway may include a default setup, and this message can update this default.

In an embodiment, the 'Sensor Reading Schedule' 528 includes an 'Action' 1120 field, which is the dimming level. The 'Sensor Reading Schedule' 528 may include a 'Start' 1122 field, which is the start time for the test, and a 'Wait' 1124 field, which is the duration to wait before any measurement commences. The 'Sensor Reading Schedule' 528 may also include a list of sensors that participate in the measurements 1126. According to an aspect, the list of sensors is given as a list of Sensor ranges per sensor 1126.

In an embodiment, the Sensor range 1126 includes a 'Sensor Type' 1156 field, which identifies the sensor, and a 'Test Type' 1158 field, which informs the gateway how to run the test. The Sensor range 1126 may also include a 'Min Value' 1160 field and a 'Max Value' 1162 fields, which are configured to provide the valid range for the sensor in this test. According to an aspect, the 'Test Type' 1158 directs the gateway to handle different sensor values. When Test Type 1158 is 'Read Only' 1166 the value of the sensor may be retrieved regardless of range. When Test Type 1164 is 'Outside of Range' 1168 the value of the sensor must be outside of the range to be retrieved. In an embodiment, when the Test Type 1158 is 'Wait for in range' 1170 the gateway does not continue with other readings until the specific sensor is in given range. According to an aspect, when Test Type 1158 is 'Wait for outside range' 1172, the gateway will not continue to read sensor values until this sensor value is outside the given range.

Figure 12:
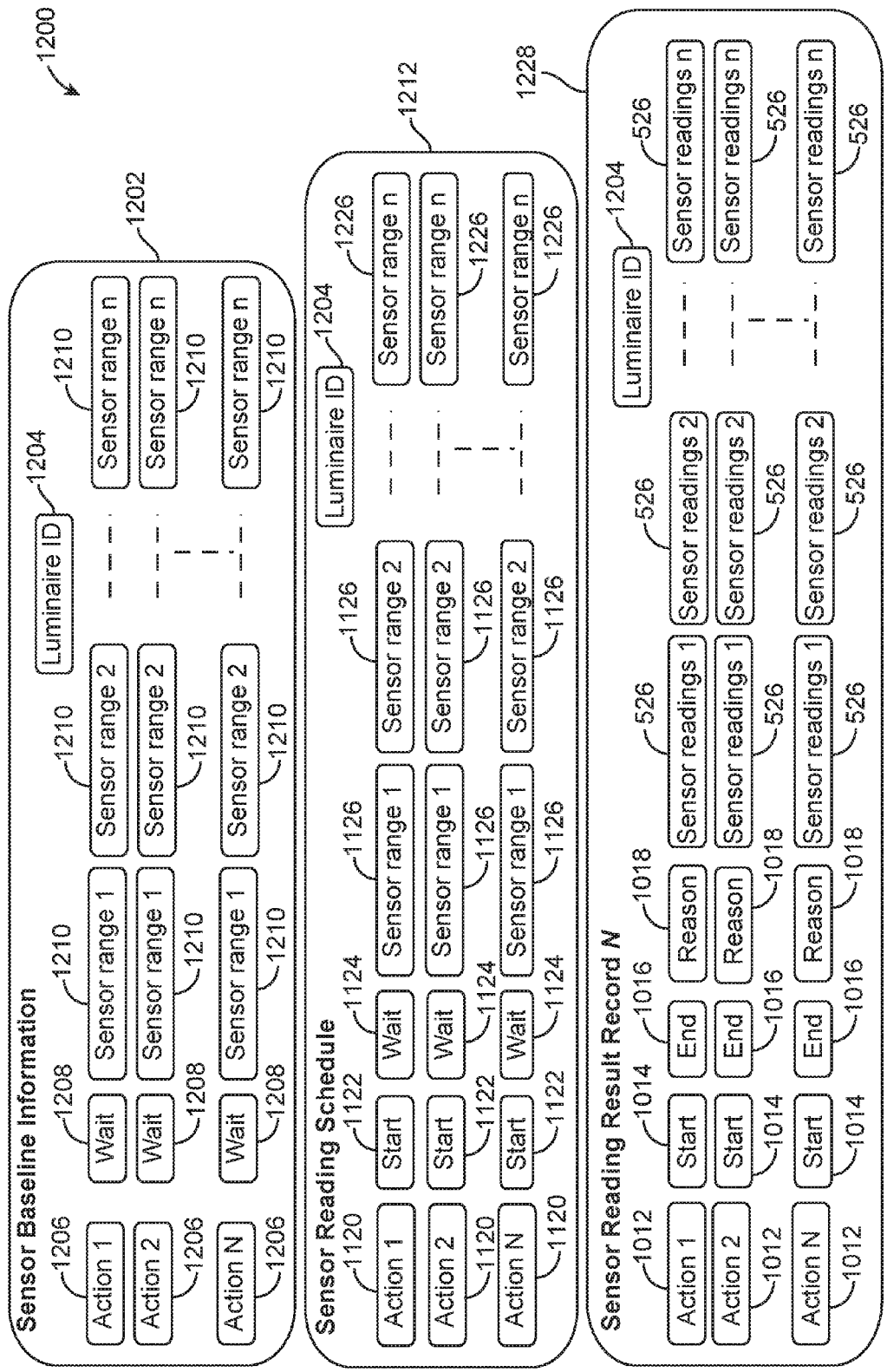
FIG. 12 illustrates a diagram of a luminaire database structure of a system, according to an aspect.

FIG. 12 depicts an embodiment 1200 of the luminaire DB structure. According to an aspect, the luminaire DB includes three types of records for every connected luminaire in the system. The records may include a Sensor Baseline Information 1202, a Sensor Reading Schedule 1212 and a Sensor Reading Result Record 1228. In an embodiment, each luminaire includes a single Sensor Baseline Information 1202 and a single Sensor Reading Schedule 1212 record. The Sensor Reading Result Record 1228 may be numbered between 1 and N. This type of record may be added for every reading result and may be being kept for as long as needed, e.g., N can be very large.

The Sensor Baseline Information 1202 may include sensor range information for all possible dimming levels that may be tested for this specific luminaire. Each dimming action field 1206 may include the minimal Wait time 1208, during which the gateway must wait before taking sensor measurements. Each dimming action field 1206 may include a list of Sensor range fields 1210, one list per sensor that needs to be monitored. According to an aspect, the Luminaire ID 1204 field identifies the luminaire that this record belongs to.

In an embodiment, the Sensor Reading Schedule 1212 record is identical to the Sensor Reading Schedule 528 (see FIG. 11), except for one additional field—the Luminaire ID 1204 field. The Luminaire ID 1204 field may be used to identify the luminaire that this record belongs to.

According to an aspect, the Sensor Reading Result Record 1228 is an accumulation of the Sensor Reading Message 1030 as described in FIG. 10, except for one additional field—the Luminaire ID 1204 field which is used to identify the luminaire that this record belongs to. In an embodiment, every time the cloud server receives a Sensor Reading Message 1030 that might be a Baseline message or an Updates message, the cloud server stores this message as a Sensor Reading Result Record 1228 for the specific luminaire.

Figure 13:
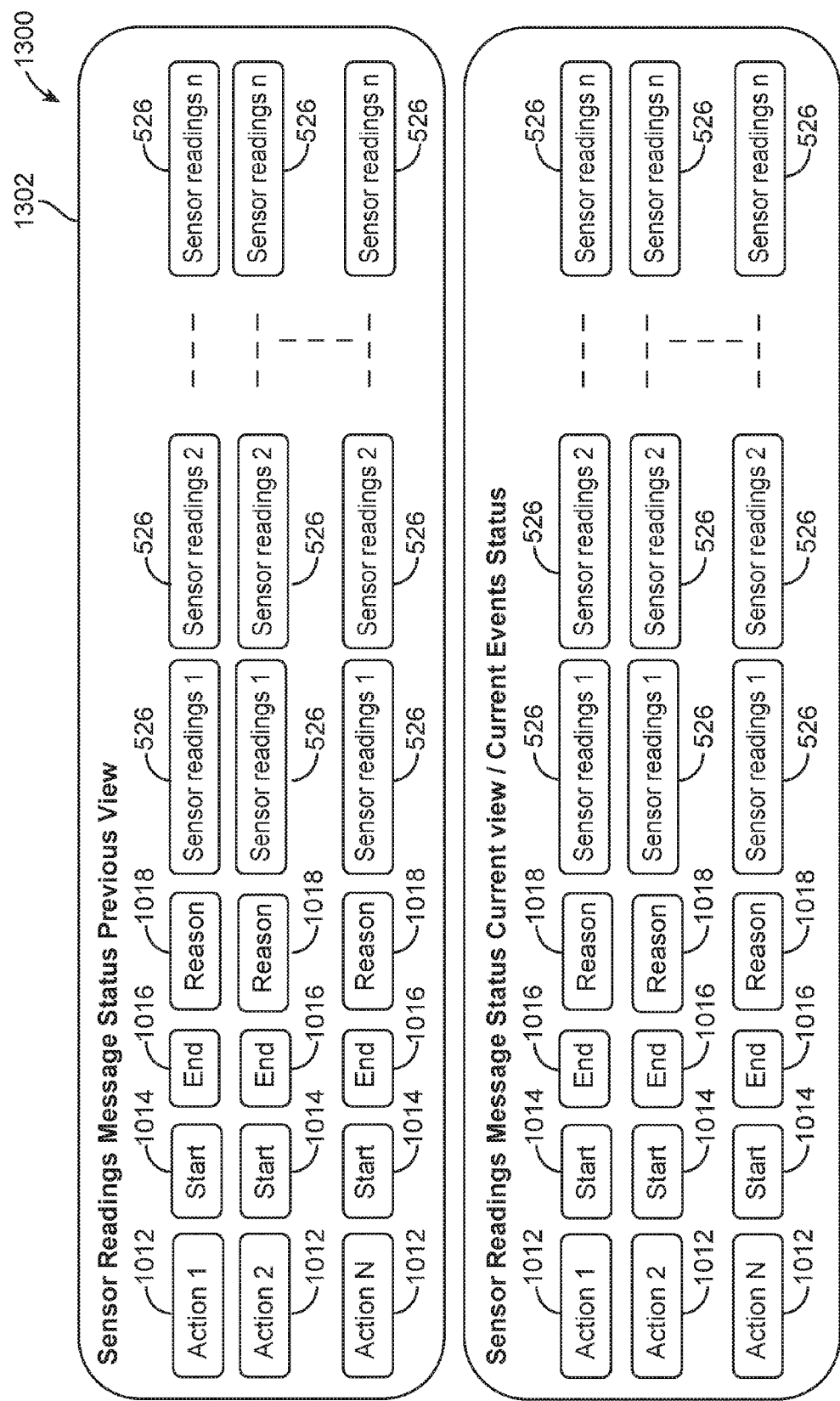
FIG. 13 illustrates a diagram of an events database and a message status database structure of a system, according to an aspect.

FIG. 13 illustrates an embodiment 1300 of the Events Database and the Message Status Database structures. In an embodiment, and as illustrated in FIG. 6, the Sensor Events DB 612 is a synonym for Message Status DB 618. The Message Status DB 618 may be an accumulation of all sensor events associated with the reporting of scheduled test results. The Sensor Events DB 612 may be used to record events in real-time, such that the information is recorded into the appropriate structures for future messages to be generated. In an embodiment, the Message Status Database 618 contains two records as shown in FIG. 13. The first record may be a Sensor Readings Message Status Previous View 1302, and the second record may be a Sensor Readings Message Status Current View/Current Events Status 1314. According to an aspect, when reading events are triggered, the appropriate fields in the Readings Message Status Current View/Current Events Status 1314 record are being updated. When an Updates message is being sent or before a Baseline message is being sent, the content of the Sensor Readings Message Status Current View/Current Events Status 1314 may be copied into the Sensor Readings Message Status Previous View 1302. According to an aspect, when the Baseline message is being sent, the entire Sensor Readings Message Status Previous View 1302 record may be sent as is. The Sensor Readings Message Status Previous View 1302 and the Readings Message Status Current View/Current Events Status 1314 are described in further detail hereinabove, with reference to FIG. 10.

Figure 14:
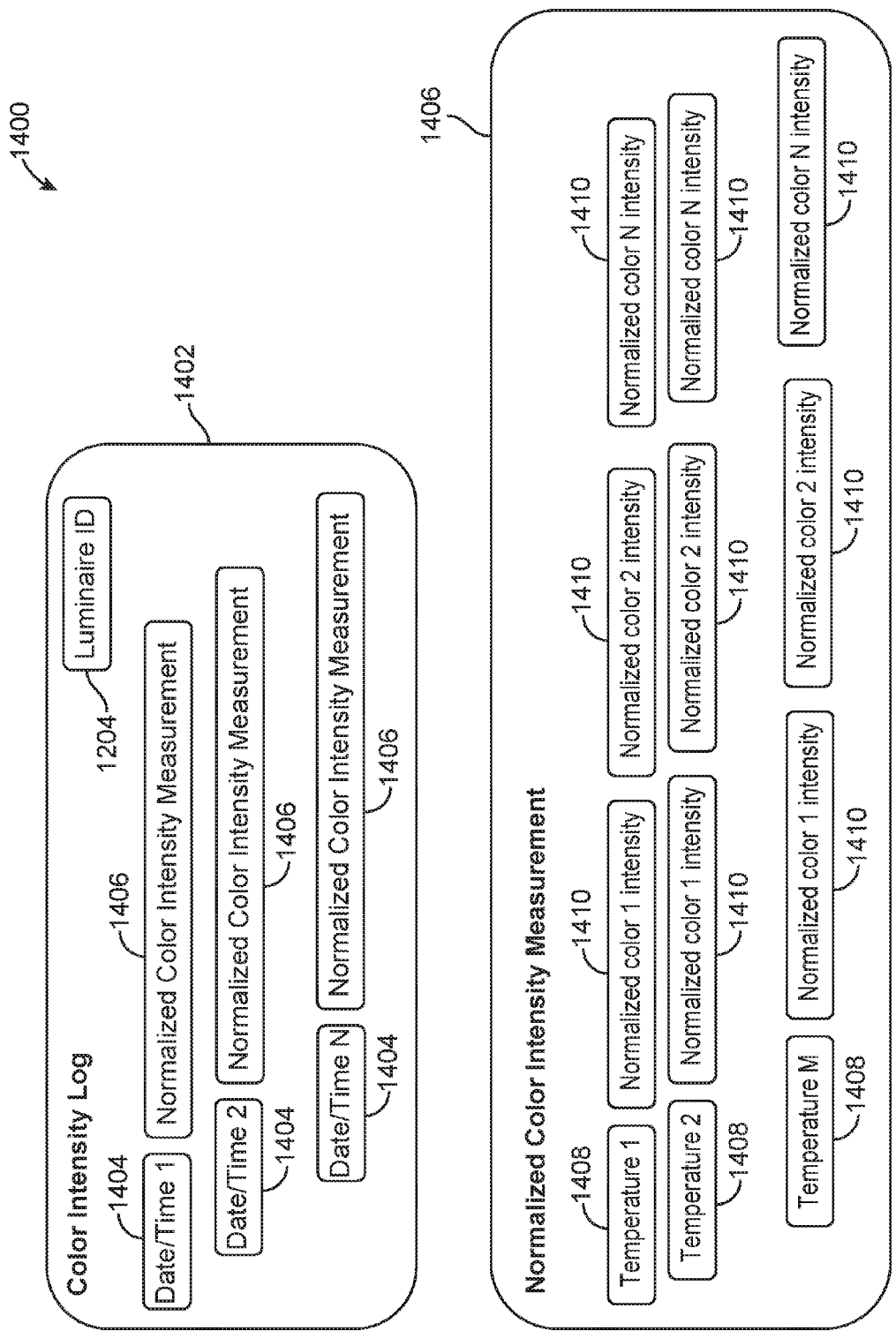
FIG. 14 illustrates a diagram of a luminaire half-life prediction database structure, according to an aspect.
Figure 15:
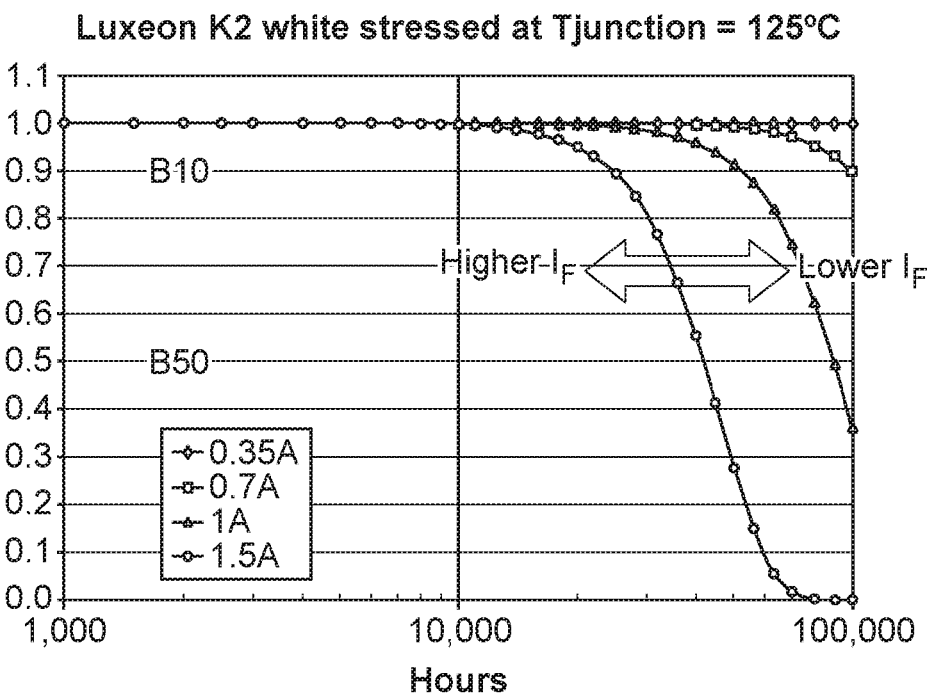
FIG. 15 illustrates a typical manufacturer's LED lifetime prediction graph at constant temperature, according to the prior art.
Figure 16:
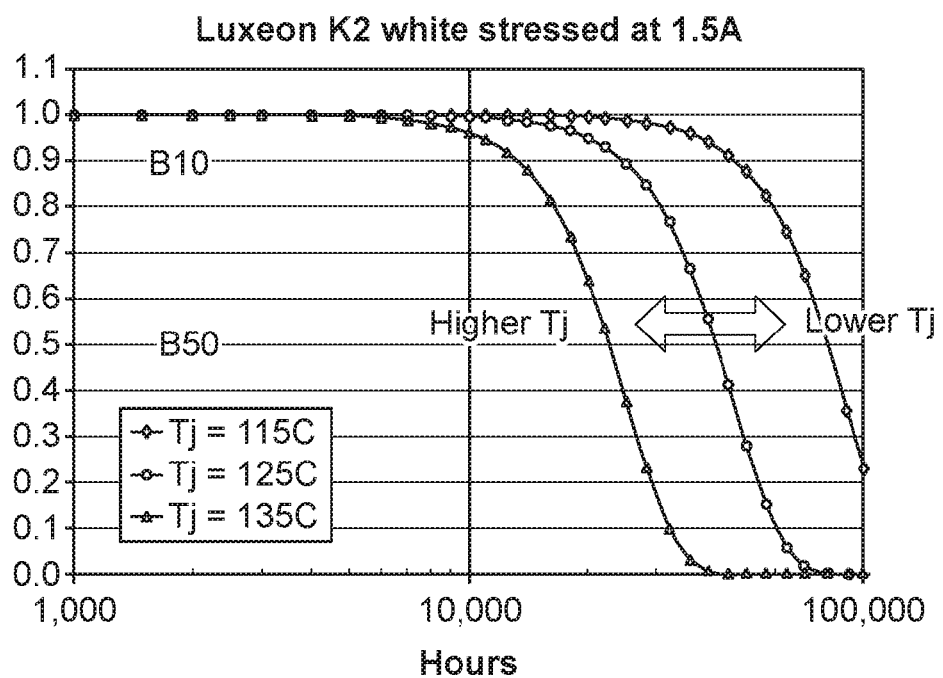
FIG. 16 illustrates a typical manufacturer's LED lifetime prediction graph at constant voltage, according to the prior art.

FIG. 14 illustrates an embodiment 1400 of the Luminaire Half-Life Prediction Database structure. This Database may be a log for all Normalized Color Intensity Measurements per luminaire in the system. According to an aspect, each Color Intensity Log 1402 record (one per luminaire) includes the Luminaire ID 1204 field to uniquely identify the luminaire that this record belongs to. The Color Intensity Log 1402 record may be composed of N Normalized Color Intensity Measurement 1406 records one per Date/Time in which this measurement was received. In an embodiment, the Normalized Color Intensity Measurement 1406 record is composed of a list of Temperature fields 1420. The Temperature field 1420 may include the temperature in which a measurement was taken and a list of normalized color intensity measurements 1422, one per color being measured in this system.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for predicting a life expectancy of a plurality of luminaires, the system comprising:
    a gateway configured to control a dimming controller to provide a plurality of dimming levels to a plurality of luminaires, the gateway further configured to receive information related to the plurality of luminaires, the information comprising a current dimming level, a color intensity, and at least one environmental condition, and the gateway further configured to relay the information to at least one server; and
    at least one sensor subsystem for detecting the information by detecting current conditions of at least one of the luminaires, the sensor subsystem comprising a first sensor to detect the color intensity and a second sensor to detect at least one change in the environmental condition, wherein the information is relayed to the gateway; wherein the server comprises:
    a luminaire database configured to receive and store the information; and
    a processor configured to receive and use the information to calculate and predict the life expectancy of the luminaires and to generate and relay a life expectancy report to a user.

2. The system of claim 1, wherein the server comprises at least one of a cloud server and a local server.

3. The system of claim 1, wherein the information further comprises information collected from luminaires located in diverse geographical locations.

4. The system of claim 1, wherein the at least one sensor subsystem detects a plurality of color channels.

5. The system of claim 1, wherein the information further comprises a current power level of the luminaires, the system further comprising at least one power meter for measuring the current power level and for relaying the current power level to the gateway.

6. The system of claim 5, wherein the server is a cloud server, and the server further comprises a schedule for monitoring the information at a plurality of dimming levels via the sensor subsystem, wherein the schedule comprises initializing and tuning up an interface with the luminaires.

7. The system of claim 6, wherein the cloud server and/or the gateway continuously monitors the information and triggers the initialization and/or tune-up of the luminaires interface based on a change in the information, and/or a change in hardware or software of the luminaire, the gateway and/or the sensor subsystem.

8. The system of claim 1, wherein the information detected by the sensor subsystem comprises a baseline condition of the luminaires at a plurality of dimming levels, and the sensor subsystem relays a baseline message of the information to the server via the gateway.

9. The system of claim 8, wherein the information detected by the sensor subsystem subsequently detects the current conditions of the luminaires, and relays at least one updates message of the information to the server via the gateway.

10. The system of claim 9, wherein the information used to calculate and predict the life expectancy of the luminaires consists of the current dimming level and a schedule, the baseline message, the updates message and a manufacturer's specification information.

11. The system of claim 10, further comprising a scheduling database for storing a time schedule for conducting the detecting of information, wherein the server accesses the scheduling database and transmits a scheduling message to record the current dimming level and to detect the current conditions of the luminaires by the sensor subsystem.

12. A system for predicting a life expectancy of a plurality of luminaires, the system comprising:
a plurality of luminaires, each of the luminaires comprising at least one light source and a dimming controller, the luminaires being connected to a gateway via at least one server, wherein the gateway is configured to control the dimming controller to provide a plurality of dimming levels of the luminaires;
the gateway further configured to receive information related to the plurality of luminaires, the information comprising a current dimming level, a color intensity, and at least one environmental condition, and the gateway further configured to relay the information to the server; and
at least one sensor subsystem for detecting the information by detecting current conditions of at least one of the luminaires, the sensor subsystem comprising a first sensor to detect the color intensity and a second sensor to detect at least one change in the environmental condition, wherein the server comprises:
a luminaire database configured to receive and store the information; and
a processor configured to receive and use the information to calculate and predict the life expectancy of the luminaires and to generate and relay a life expectancy report to a user.

13. A method of predicting a life expectancy of a plurality of luminaires, the method comprising:
controlling by at least one gateway a dimming level of the luminaires;
detecting by at least one sensor subsystem information related to the plurality of luminaires, the information comprising a current dimming level, color intensity, and at least one environmental condition and relaying the information to at least one server via the gateway;
receiving and transmitting by the gateway to the server at least one current power measurement data from at least one power meter;
providing a manufacturer's specification information to the server;
calculating by the server a depreciation of dimming levels of the luminaires by performing a correlation operation to generate a correlation information between at least one of the information and the current power measurement data; and
predicting by the at least one server a life expectancy by correlating the manufacturer's specification information, the correlation information, and the information; and reporting the life expectancy to a user.

14. The method of claim 13, further comprising:
providing a schedule to the gateway via the server, wherein the schedule instructs the gateway to set a certain dimming level, and the detecting of the information is performed at the certain dimming level, and the information collected at the certain dimming level is relayed to the server, and the predicting of the life expectancy is updated.

15. The method of claim 14, updating the schedule based on differences between the current information received and the previous information received.

16. The method of claim 13, further comprising:
predicting by the server at least one of a 70% lumen measurement and a 50% lumen measurement of the luminaire; and
recommending by the at least one server at least one alternative schedule to extend the lumen measurement of the luminaire while maintaining expected luminosity at an appropriate level.

17. The method of claim 13, wherein the receiving and transmitting by the gateway comprises a compressed format of at least one of a baseline message and an updates message, wherein the at least one baseline message comprises full sensor readings, power level readings, and current dimming status readings, and wherein the at least one updates message comprises at least a major change, the at least one major change being a pre-defined difference between a current updates message in comparison with a previous updates message.

18. The method of claim 13, wherein the detecting by the sensor subsystem comprises detecting a plurality of color channels, and when the plurality of color channels are inconsistent as between themselves, the system will recognize the inconsistency and will take actions accordingly.

* * * * *